US010191641B2

(12) United States Patent
Chen et al.

(10) Patent No.: US 10,191,641 B2
(45) Date of Patent: Jan. 29, 2019

(54) DEVICE, METHOD, AND GRAPHICAL USER INTERFACE FOR NAVIGATION OF INFORMATION IN A MAP-BASED INTERFACE

(75) Inventors: Billy Chen, Santa Clara, CA (US); Patrick Steven Piemonte, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 957 days.

(21) Appl. No.: 13/536,650

(22) Filed: Jun. 28, 2012

(65) Prior Publication Data

US 2013/0174087 A1     Jul. 4, 2013

Related U.S. Application Data

(60) Provisional application No. 61/581,613, filed on Dec. 29, 2011.

(51) Int. Cl.
| | |
|---|---|
| *G06F 3/041* | (2006.01) |
| *G06F 3/048* | (2013.01) |
| *G06Q 30/00* | (2012.01) |
| *G06Q 10/00* | (2012.01) |
| *G06F 3/0485* | (2013.01) |
| *G06F 3/0488* | (2013.01) |

(Continued)

(52) U.S. Cl.
CPC .......... *G06F 3/0485* (2013.01); *G06F 3/0488* (2013.01); *G06F 3/041* (2013.01); *G06F 7/00* (2013.01); *G06F 17/00* (2013.01); *G06F 2203/04806* (2013.01)

(58) Field of Classification Search
CPC . G06F 3/048; G06F 3/041; G06F 3/00; G06F 17/30; G06F 17/00; G09B 29/00; G06Q 30/00; G06Q 10/00

USPC .................................................. 715/726, 833
See application file for complete search history.

(56) References Cited

U.S. PATENT DOCUMENTS

| | | | | |
|---|---|---|---|---|
| 4,558,300 | A * | 12/1985 | Goldman | 340/286.14 |
| 7,477,233 | B2 | 1/2009 | Duncan et al. | |
| 7,916,157 | B1 * | 3/2011 | Kelley et al. | 345/660 |

(Continued)

OTHER PUBLICATIONS

Google, "Take Google Maps Indoors", available at <https://www.youtube.com/watch?feature=endscreen&NR=1&v=Gy-D1_bWEIg>, Uploaded on Nov. 28, 2011, 3 pages.

(Continued)

*Primary Examiner* — Hugo Molina
(74) *Attorney, Agent, or Firm* — Dentons US LLP

(57) ABSTRACT

A device with a display and a touch-sensitive surface: displays a geographic map in a first mode of an application, the geographic map including a plurality of landmarks, the geographic map being displayed at a first magnification level; detects a first input, the first input including a first finger contact at a location on the touch-sensitive surface that corresponds to a first landmark on the display; in response to detecting the first input: when the first input does not satisfy one or more predefined mode-change conditions, changes the magnification level in accordance with the first input and remains in the first mode; and when the first input satisfies the mode-change conditions, selects the first landmark and enters a second mode of the application; while in the second mode, detects a second input; and, in response to detecting the second input, displays information about the first landmark.

72 Claims, 22 Drawing Sheets

(51) Int. Cl.
*G06F 7/00* (2006.01)
*G06F 17/00* (2006.01)

(56) References Cited

U.S. PATENT DOCUMENTS

| | | | |
|---|---|---|---|
| 8,171,432 B2 | 5/2012 | Matas et al. | |
| 8,302,033 B2 | 10/2012 | Matas et al. | |
| 8,484,187 B1* | 7/2013 | Hong | G06F 17/30864 707/706 |
| 8,607,167 B2 | 12/2013 | Matas et al. | |
| 8,619,100 B2 | 12/2013 | Capela et al. | |
| 8,868,338 B1* | 10/2014 | Chau | G06T 11/206 701/455 |
| 2007/0210937 A1* | 9/2007 | Smith | G08G 1/0962 340/995.1 |
| 2007/0218900 A1* | 9/2007 | Abhyanker | G06Q 10/087 455/435.1 |
| 2008/0320419 A1* | 12/2008 | Matas et al. | 715/863 |
| 2010/0090971 A1* | 4/2010 | Choi | G06F 3/04883 345/173 |
| 2010/0118025 A1* | 5/2010 | Smith | G06Q 30/02 345/418 |
| 2010/0123737 A1* | 5/2010 | Williamson et al. | 345/672 |
| 2010/0283743 A1* | 11/2010 | Coddington | G06F 3/0485 345/173 |
| 2011/0059759 A1* | 3/2011 | Ban | G06F 3/04883 455/466 |
| 2011/0074710 A1 | 3/2011 | Weeldreyer et al. | |
| 2011/0074830 A1 | 3/2011 | Rapp et al. | |
| 2011/0163971 A1 | 7/2011 | Wagner et al. | |
| 2011/0227699 A1* | 9/2011 | Seth et al. | 340/8.1 |
| 2011/0249030 A1* | 10/2011 | Hirose | G01C 21/3638 345/650 |
| 2011/0283232 A1* | 11/2011 | Jordan | H04N 5/44543 715/810 |
| 2011/0302529 A1* | 12/2011 | Yamamoto | G06F 3/04883 715/800 |
| 2011/0316884 A1* | 12/2011 | Giambalvo et al. | 345/660 |
| 2012/0008865 A1* | 1/2012 | Wu | G06K 9/3258 382/182 |
| 2012/0218196 A1* | 8/2012 | Lv | G06F 3/0416 345/173 |
| 2012/0223936 A1* | 9/2012 | Aughey | G06F 3/04815 345/419 |
| 2013/0019201 A1* | 1/2013 | Cabrera-Cordon | G06F 3/04842 715/810 |
| 2013/0033448 A1* | 2/2013 | Yano | G06F 3/04883 345/173 |
| 2013/0244733 A1* | 9/2013 | Ueno | H04M 1/0214 455/566 |

OTHER PUBLICATIONS

Google, "Take Google Maps inside IKEA", available at <https://www.youtube.com/watch?v=kT0KMsfD4d8&feature=relmfu>, Uploaded on Nov. 28, 2011, 2 pages.

Kim, Arnold, "C3 Technologies' 3D Maps Also Offer Street Views and Interior Views", available at <http://www.macrumors.com/2011/11/07/c3-technologies-3d-maps-also-offer-street-views-and-interior-views/>, Nov. 6, 2011, 7 pages.

Marsal, Katie, "Apple Acquires Online Mapping Company Poly9—Report", available at <http://appleinsider.com/articles/10/07/14/apple_acquires_online_mapping_company_poly9_report>, Jul. 14, 2010, 8 pages.

POLY9 Group Inc., "Our work", available at <http://web.archive.org/web/20080517022443/http://www.poly9.com/Our-work>, May 13, 2008-Aug. 23, 2010, 1 page.

POLY9 Group Inc., "Poly9 FreeEarth—Features", available at <http://web.archive.org/web/20080517123822/http://freeearth.poly9.com/Features>, May 17, 2008, Apr. 12, 2010, 2 pages.

Rob, "Source Reveals Specs and Release Date of Next iPhone!", available at <http://appadvice.com/appnn/2009/05/source-reveals-specs-and-release-date-of-next-iphone>, May 19, 2009, 9 pages.

Ron, Lior, "Place Pages for Google Maps: There are Places we Remember!", available at <http://googleblog.blogspot.in/2009/09/place-pages-for-google-maps-there-are.html>, Sep. 24, 2009, 5 pages.

VODAFONEHELPCENTRE, "Maps and Places on the Samsung Galaxy Tab from Vodafone", available at <https://www.youtube.com/watch?v=Wvs2r-apPGc>, Uploaded on Oct. 26, 2010, 2 pages.

Zibreg, Christian, "Google Maps for Android gets Places", available at <http://www.geek.com/android/google-maps-for-android-gets-places-1272921/>, Jul. 27, 2010, 4 pages.

Zibreg, Christian, "Poly9 Exposed as Apple's Second Mapping Acquisition", available at <http://www.geek.com/apple/poly9-exposed-as-apples-second-mapping-acquisition-1269872/>, Jul. 14, 2010, 4 pages.

\* cited by examiner

DEVICE, METHOD, AND GRAPHICAL USER INTERFACE FOR NAVIGATION OF INFORMATION IN A MAP-BASED INTERFACE

RELATED APPLICATION

This application claims priority to U.S. Provisional Application Ser. No. 61/581,613, filed Dec. 29, 2011, which is incorporated herein by reference in its entirety.

TECHNICAL FIELD

This relates generally to electronic devices with touch-sensitive surfaces, including but not limited to electronic devices with touch-sensitive surfaces that navigate through information in a map-based interface.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include interacting with a map application or interface to access various pieces of information. But existing methods for accessing information in a map application or interface are cumbersome and inefficient. For example, there may be many pieces, types, and/or levels of information for a single location on a map. But such information is presented in ways that do not facilitate cognitive association with the single location and that do not facilitate smooth navigation between the pieces, types, and/or levels of information. This creates a significant cognitive burden on a user and lessens the utility of the information. In addition, existing methods take longer than necessary to navigate through the information, thereby wasting energy. This latter consideration is particularly important in battery-operated devices.

SUMMARY

Accordingly, there is a need for electronic devices with faster, more efficient methods and interfaces for navigating through information in a map-based interface. Such methods and interfaces may complement or replace conventional methods for navigating through information in a map-based interface. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, in addition to mapping, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display and a touch-sensitive surface. The method includes: displaying a geographic map in a first mode of an application on the display, the geographic map including a plurality of landmarks, the geographic map being displayed at a first magnification level in a range of magnification levels; detecting a first input on the touch-sensitive surface, the first input including a first finger contact at a location on the touch-sensitive surface that corresponds to a first landmark on the display; in response to detecting the first input on the touch-sensitive surface: when the first input does not satisfy one or more predefined mode-change conditions, changing the magnification level of the geographic map in accordance with the first input and remaining in the first mode of the application; and when the first input satisfies the one or more predefined mode-change conditions, selecting the first landmark and entering a second mode of the application that is distinct from the first mode; while in the second mode of the application, detecting a second input on the touch-sensitive surface; and, in response to detecting the second input on the touch-sensitive surface, displaying information about the first landmark.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: displaying a geographic map in a first mode of an application on the display, the geographic map including a plurality of landmarks, the geographic map being displayed at a first magnification level in a range of magnification levels; detecting a first input on the touch-sensitive surface, the first input including a first finger contact at a location on the touch-sensitive surface that corresponds to a first landmark on the display; in response to detecting the first input on the touch-sensitive surface: when the first input does not satisfy one or more predefined mode-change conditions, changing the magnification level of the geographic map in accordance with the first input and remaining in the first mode of the application; and when the first input satisfies the one or more predefined mode-change conditions, selecting the first landmark and entering a second mode of the application that is distinct from the first mode; while in the second mode of the application, detecting a second input on the touch-sensitive surface; and, in response to detecting the second input on the touch-sensitive surface, displaying information about the first landmark.

In accordance with some embodiments, a computer readable storage medium has stored therein instructions which when executed by an electronic device with a display and a touch-sensitive surface, cause the device to: display a geographic map in a first mode of an application on the display, the geographic map including a plurality of landmarks, the geographic map being displayed at a first magnification level in a range of magnification levels; detect a first input on the touch-sensitive surface, the first input including a first finger contact at a location on the touch-sensitive surface that corresponds to a first landmark on the display; in response to detecting the first input on the touch-sensitive surface: when the first input does not satisfy one or more predefined mode-change conditions, change the magnification level of the geographic map in accordance with the first input and remain in the first mode of the application; and when the first input satisfies the one or more predefined mode-change conditions, select the first landmark and enter a second mode of the application that is distinct from the first mode; while in the second mode of the application, detect a second input on the touch-sensitive surface; and, in response to detecting the second input on the touch-sensitive surface, display information about the first landmark.

In accordance with some embodiments, a graphical user interface on an electronic device with a display, a touch-sensitive surface, a memory, and one or more processors to execute one or more programs stored in the memory includes a geographic map in a first mode of an application, the geographic map including a plurality of landmarks, the geographic map being displayed at a first magnification level in a range of magnification levels. In response to detection of a first input on the touch-sensitive surface, the first input including a first finger contact at a location on the touch-sensitive surface that corresponds to a first landmark: when the first input does not satisfy one or more predefined mode-change conditions, the magnification level of the geographic map is changed in accordance with the first input and the geographic map remains in the first mode of the application; and when the first input satisfies the one or more predefined mode-change conditions, the first landmark is selected and a second mode of the application that is distinct from the first mode is entered; and, in response to detection of a second input on the touch-sensitive surface while in the second mode of the application, information about the first landmark is displayed.

In accordance with some embodiments, an electronic device includes: a display; a touch-sensitive surface; means for displaying a geographic map in a first mode of an application on the display, the geographic map including a plurality of landmarks, the geographic map being displayed at a first magnification level in a range of magnification levels; means for detecting a first input on the touch-sensitive surface, the first input including a first finger contact at a location on the touch-sensitive surface that corresponds to a first landmark on the display; means, responsive to detecting the first input on the touch-sensitive surface, for, when the first input does not satisfy one or more predefined mode-change conditions, changing the magnification level of the geographic map in accordance with the first input and remaining in the first mode of the application; means, responsive to detecting the first input on the touch-sensitive surface, for, when the first input satisfies the one or more predefined mode-change conditions, selecting the first landmark and entering a second mode of the application that is distinct from the first mode; means for, while in the second mode of the application, detecting a second input on the touch-sensitive surface; and, means, responsive to detecting the second input on the touch-sensitive surface, for displaying information about the first landmark.

In accordance with some embodiments, an information processing apparatus for use in an electronic device with a display and a touch-sensitive surface includes: means for displaying a geographic map in a first mode of an application on the display, the geographic map including a plurality of landmarks, the geographic map being displayed at a first magnification level in a range of magnification levels; means for detecting a first input on the touch-sensitive surface, the first input including a first finger contact at a location on the touch-sensitive surface that corresponds to a first landmark on the display; means, responsive to detecting the first input on the touch-sensitive surface, for, when the first input does not satisfy one or more predefined mode-change conditions, changing the magnification level of the geographic map in accordance with the first input and remaining in the first mode of the application; means, responsive to detecting the first input on the touch-sensitive surface, for, when the first input satisfies the one or more predefined mode-change conditions, selecting the first landmark and entering a second mode of the application that is distinct from the first mode; means for, while in the second mode of the application, detecting a second input on the touch-sensitive surface; and, means, responsive to detecting the second input on the touch-sensitive surface, for displaying information about the first landmark.

In accordance with some embodiments, an electronic device includes a display unit configured to display a geographic map in a first mode of an application on the display unit, the geographic map including a plurality of landmarks, the geographic map being displayed at a first magnification level in a range of magnification levels; a touch-sensitive surface unit configured to receive inputs and gestures; and a processing unit coupled to the display unit and the touch-sensitive surface unit. The processing unit is configured to: detect a first input on the touch-sensitive surface unit, the first input including a first finger contact at a location on the touch-sensitive surface unit that corresponds to a first landmark on the display unit; in response to detecting the first input on the touch-sensitive surface unit: when the first input does not satisfy one or more predefined mode-change conditions, change the magnification level of the geographic map in accordance with the first input and remain in the first mode of the application; and when the first input satisfies the one or more predefined mode-change conditions, select the first landmark and enter a second mode of the application that is distinct from the first mode; while in the second mode of the application, detect a second input on the touch-sensitive surface unit; and, in response to detecting the second input on the touch-sensitive surface unit, enable display of information about the first landmark.

Thus, electronic devices with displays and touch-sensitive surfaces are provided with faster, more efficient methods and interfaces for navigating through information in a map-based interface, thereby increasing the effectiveness, efficiency, and user satisfaction with such devices. Such methods and interfaces may complement or replace conventional methods for navigating through information in a map-based interface.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
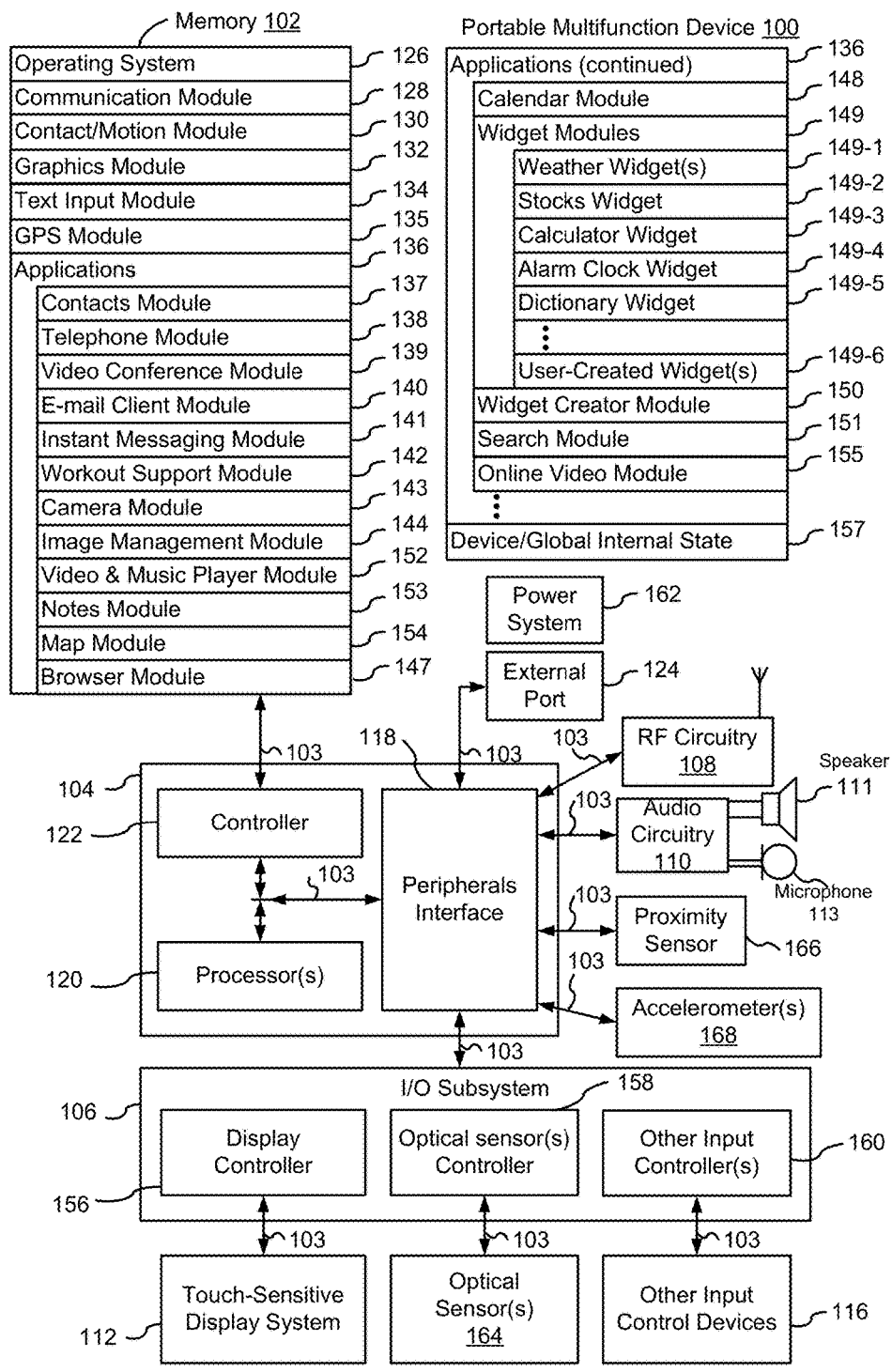
FIG. 1A is a block diagram illustrating a portable multifunction device with a touch-sensitive display in accordance with some embodiments.

Many electronic devices are capable of displaying geographic maps in a map application or mapping interface. Such maps and mapping interfaces allow users the opportunity to find information about landmarks in the maps. However, a landmark may have a wide variety of information that can be displayed, and current methods of presenting and navigating through such information are cumbersome. The embodiments below describe methods for navigating through various pieces, types, and/or levels of information for a landmark on a map. When a user performs a gesture on a landmark in a map interface and one or more conditions are satisfied, the map interface changes from a map viewing mode to a landmark information mode. The user performs a gesture (e.g., a depinch gesture) on the landmark while in the landmark information mode to bring up information about that landmark. The user may repeat the gesture to bring up different information about the landmark, or perform a different gesture to change back to the map viewing mode. This gives the user a more efficient way to navigate on a map and bring up various types of information about a landmark on the map using simple gestures.

Below, FIGS. 1A-1B, 2, 3, and 7 provide a description of exemplary devices. FIGS. 4A-4B and 5A-5K illustrate exemplary user interfaces for navigating through information in a map-based interface. FIGS. 6A-6D are flow diagrams illustrating a method of navigating through information in a map-based interface. The user interfaces in FIGS. 5A-5K are used to illustrate the processes in FIGS. 6A-6D.

EXEMPLARY DEVICES

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
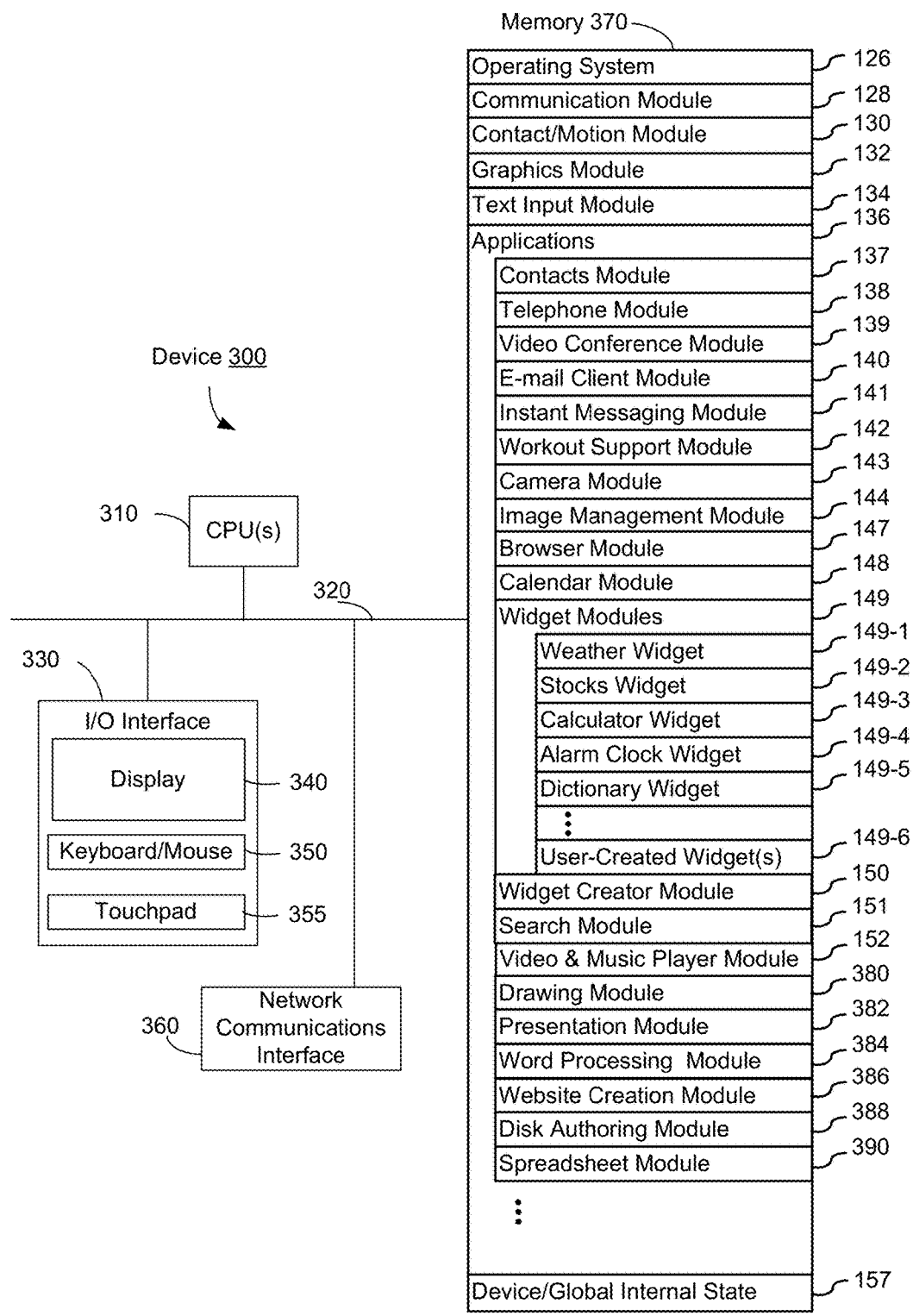
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on landmarks such as businesses and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
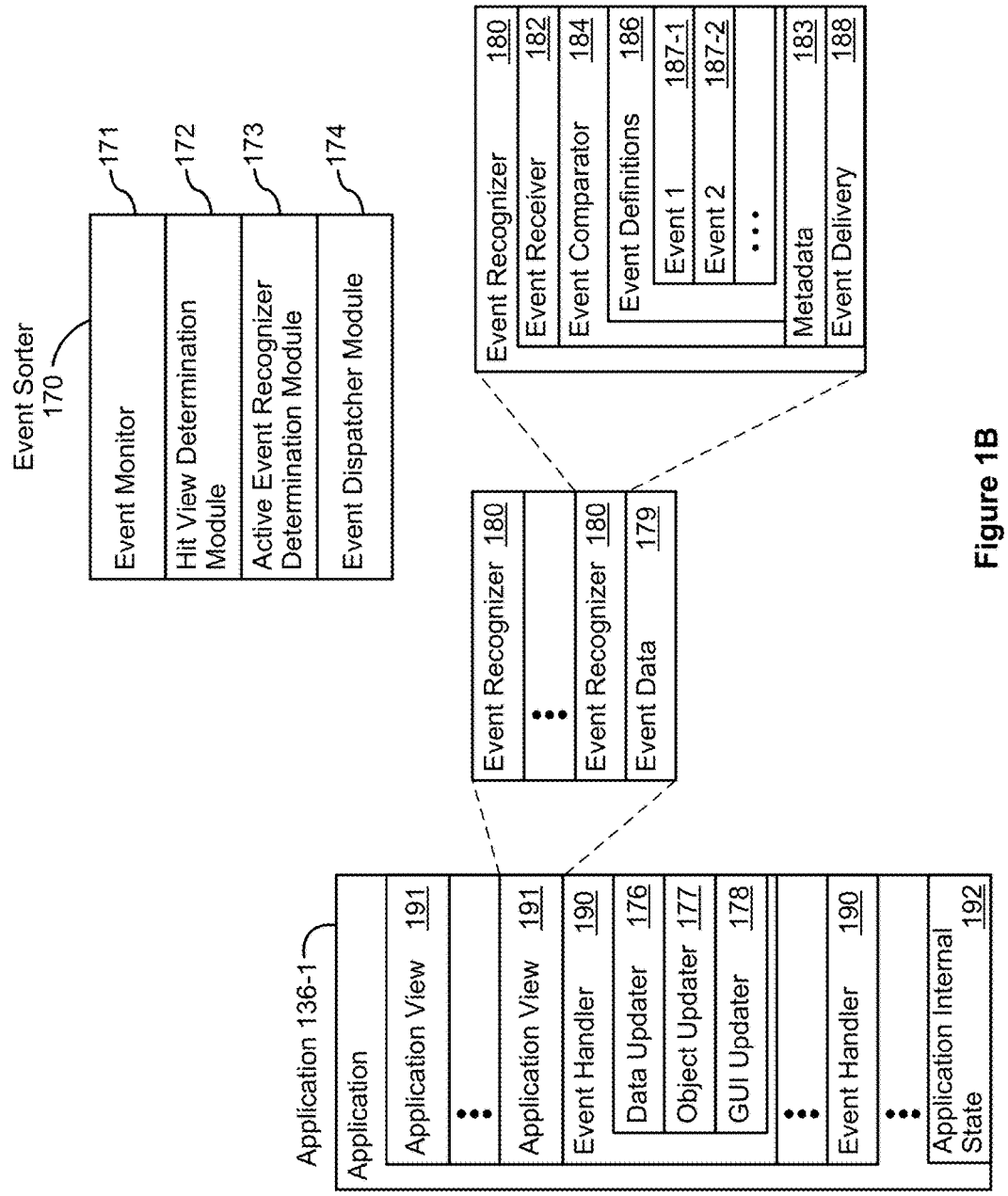
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
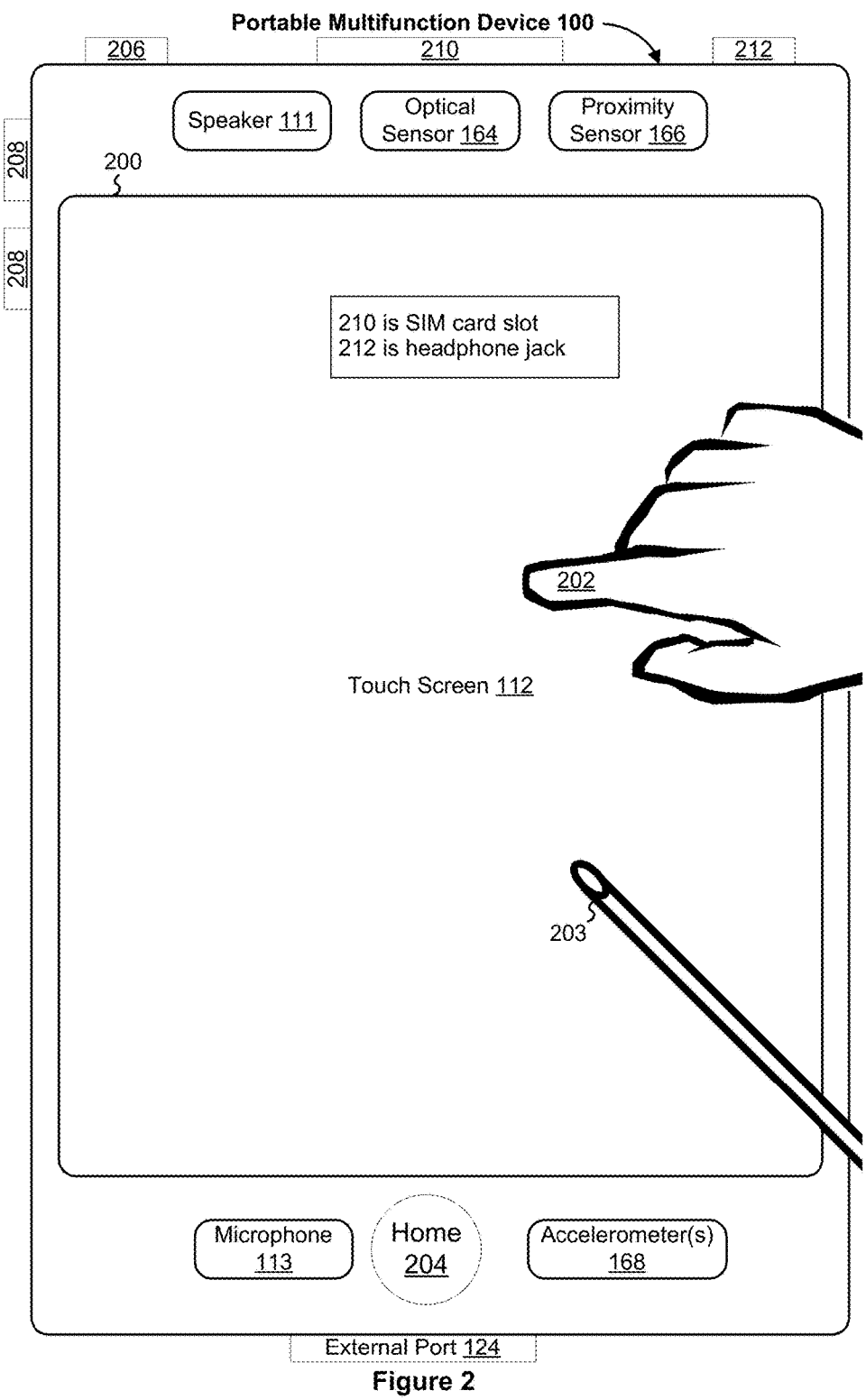
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
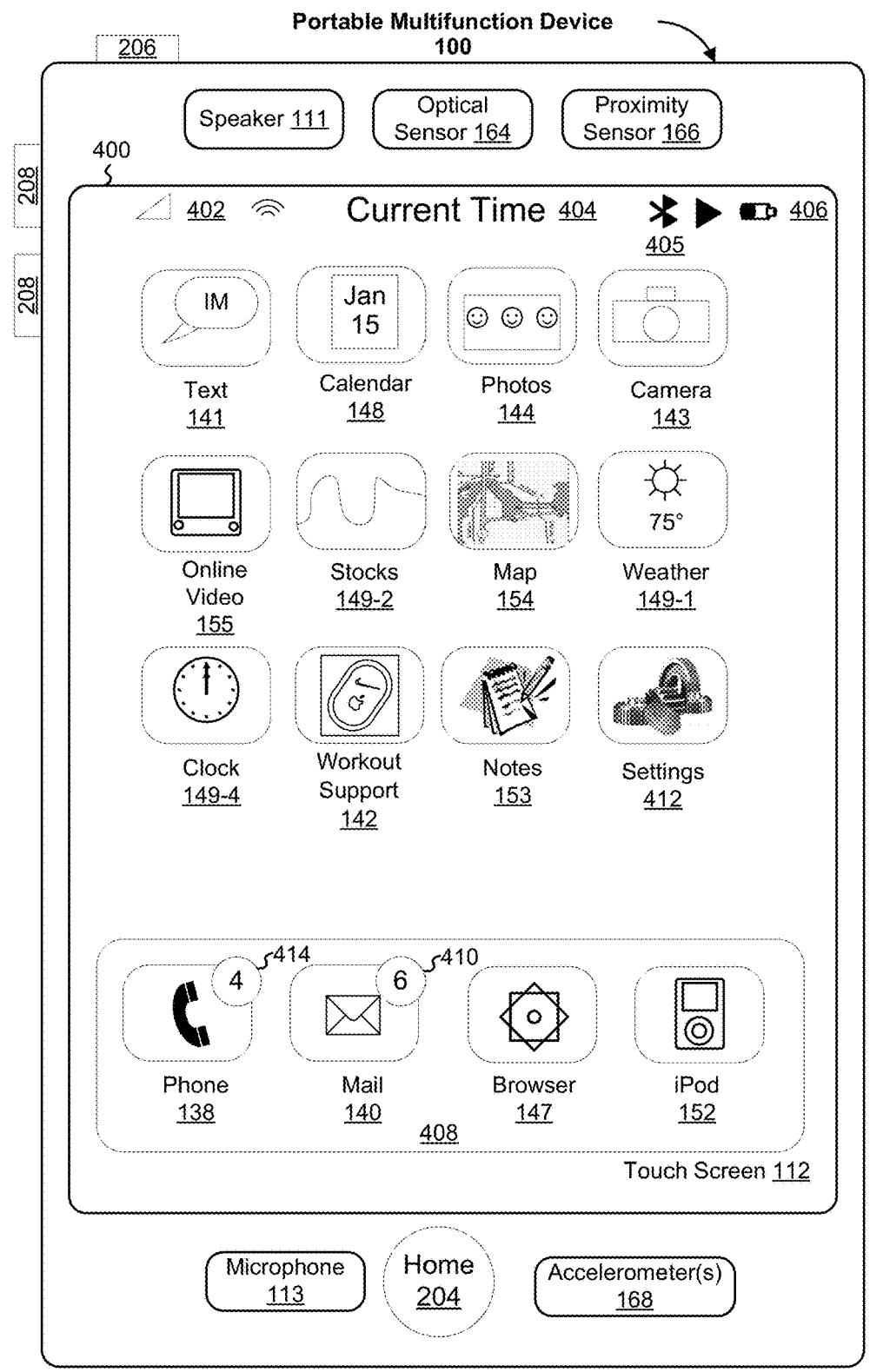
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;

Tray 408 with icons for frequently used applications, such as:
- Phone 138, which may include an indicator 414 of the number of missed calls or voicemail messages;
- E-mail client 140, which may include an indicator 410 of the number of unread e-mails;
- Browser 147; and
- Video and music player 152, also referred to as iPod (trademark of Apple Inc.) module 152; and Icons for other applications, such as:
- IM 141;
- Image management 144;
- Camera 143;
- Weather 149-1;
- Stocks 149-2;
- Workout support 142;
- Calendar 148;
- Alarm clock 149-4;
- Map 154;
- Notes 153;
- Settings 412, which provides access to settings for device 100 and its various applications 136; and
- Online video module 155, also referred to as YouTube (trademark of Google Inc.) module 155.

Figure 4B:
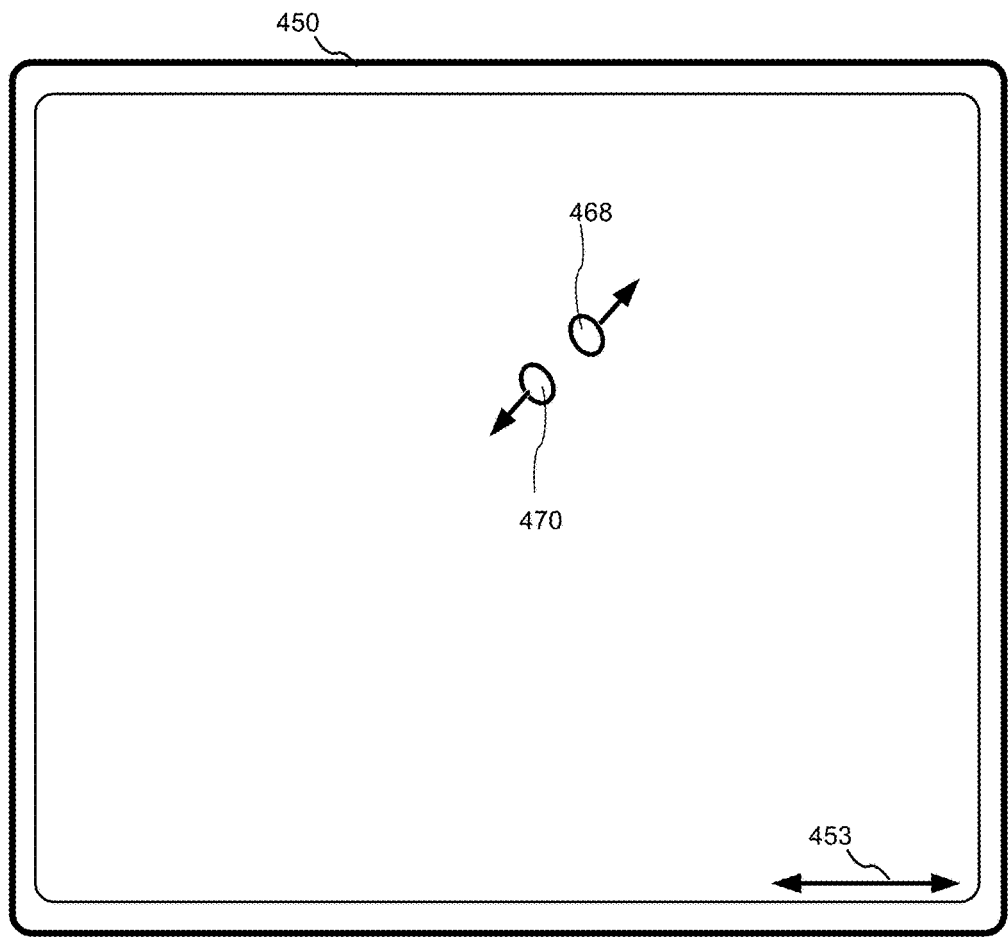
FIG. 4B illustrates an exemplary user interface for a multifunction device with a touch-sensitive surface that is separate from the display in accordance with some embodiments.
Figure 4B:
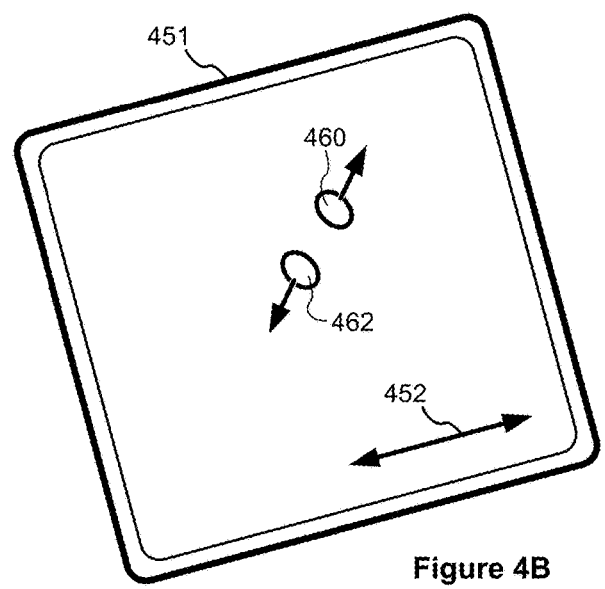

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5K illustrate exemplary user interfaces for navigating through information in a map-based interface in accordance with some embodiments. The user interfaces in these figures are used to illustrate the processes described below, including the processes in FIGS. 6A-6D.

Figure 5A:
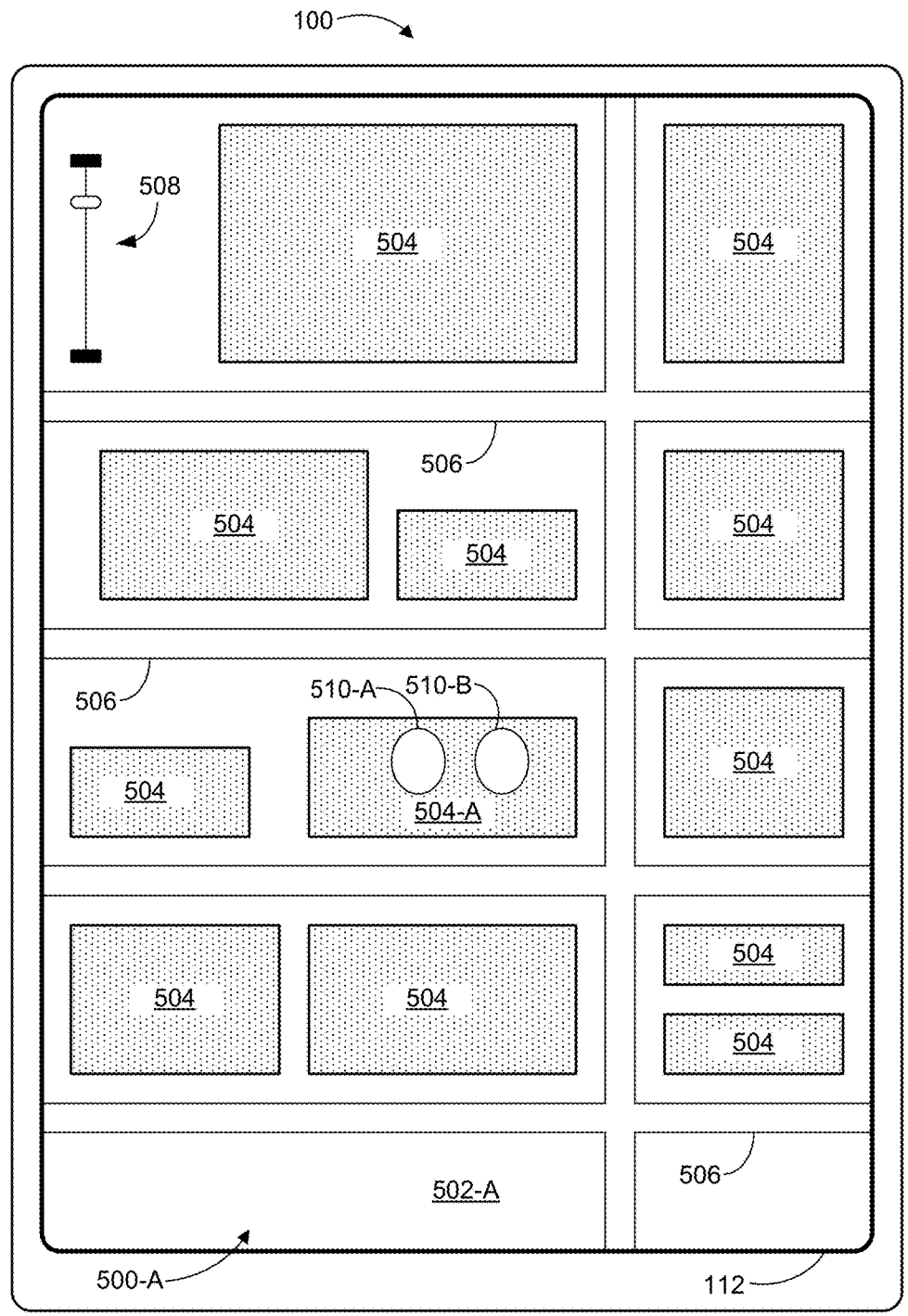
FIGS. 5A-5K illustrate exemplary user interfaces for navigating through information in a map-based interface in accordance with some embodiments.

FIG. 5A illustrates an exemplary user interface ("UI") 500 of a map application 154 displayed on touch screen 112 of device 100. UI 500 is displayed in a first mode (e.g., a map viewing mode) of the map application; UI 500 displayed in the first mode is identified as UI 500-A in the figures and in the description below. Geographic map 502 is displayed in UI 500-A at a first magnification level. Geographic map (or "map") 502 at the first magnification level is labeled as geographic map 502-A in the figures and in the description below. Geographic map 502 may be displayed at any of a predefined range of magnification levels, and the first magnification level is one of the levels in the range.

In some embodiments, also displayed in UI 500 is magnification level range slider 508. Magnification level range slider 508 indicates the current magnification level at which map 502 is displayed, relative to the predefined range of magnification levels. A user may interact with slider 508 (e.g., by dragging the slider) to change the magnification level of map 502 displayed in UI 500.

In some embodiments, map 502 may be an overhead (i.e., 90 degrees relative to the ground) two-dimensional image (or multiple images arranged together), an overhead (i.e., 90 degrees relative to the ground) satellite photo image (or multiple images arranged together), an angled (i.e., less than 90 degrees relative to the ground) map or satellite photo image(s), or three-dimensional (3D) image(s).

Different types of geographic objects may be represented in map 502. For example, map 502-A includes landmarks 504 and streets 506. Examples of landmarks 504 include buildings, designated or demarcated open areas (e.g., parks), monuments, etc. In map 502-A, landmarks 504 and streets 506 are displayed as viewed from overhead.

Gesture 510 is detected on touch screen 112 at a location corresponding to landmark 504-A in map 502-A. Gesture 510 includes contacts (e.g., finger contacts) 510-A and 510-B, both of which are at respective locations corresponding to landmark 504-A. In some embodiments, gesture 510 is a multi-finger tap gesture (as shown in FIG. 5A). In some other embodiments, gesture 510 is a depinch gesture; contacts 510-A and 510-B move apart from each other. In some further embodiments, gesture 510 is a single-finger tap gesture and gesture 510 has just one contact (e.g., contact 510-A).

Figure 5B:
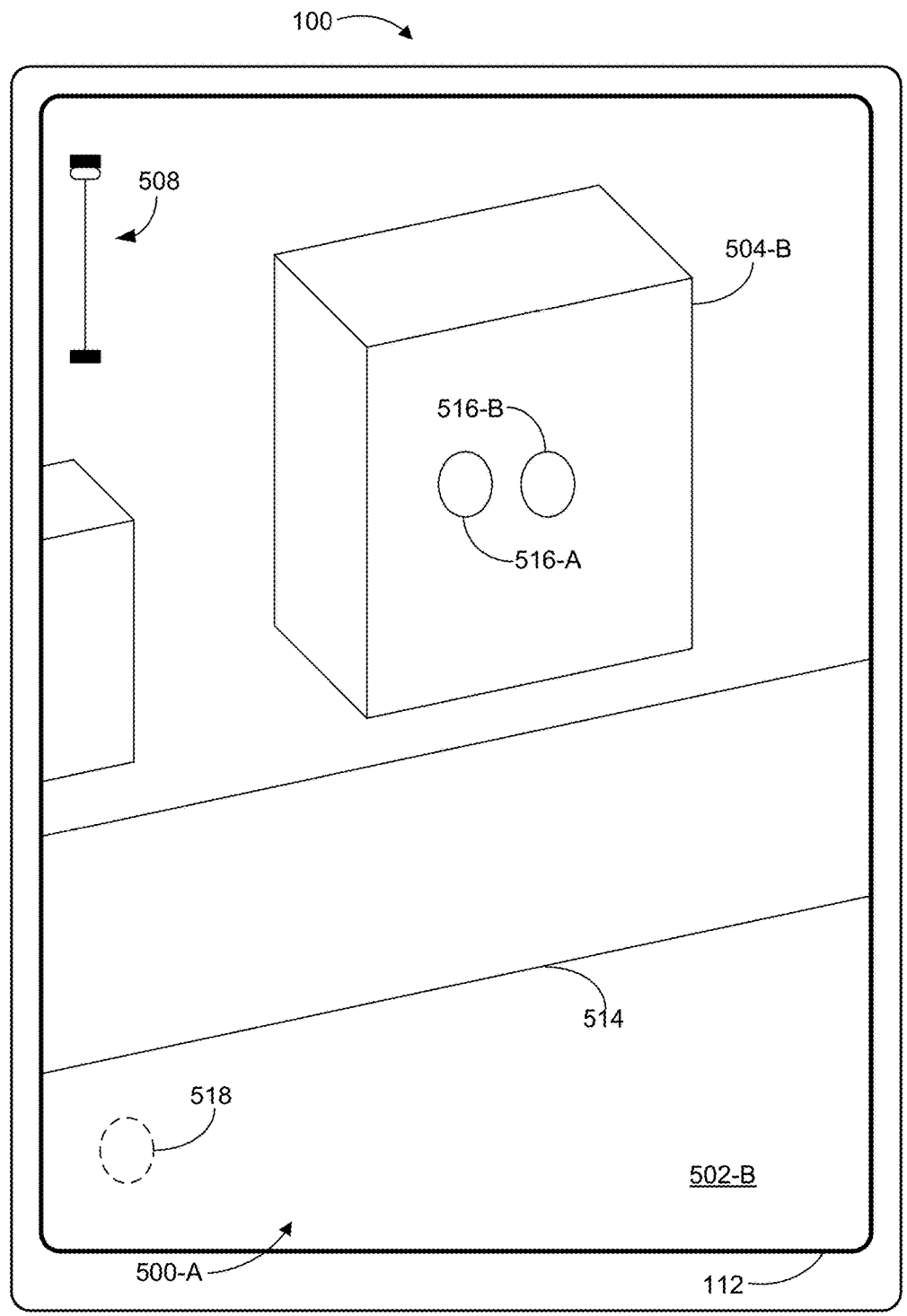

In response to the detection of gesture 510, geographic map 502 is displayed, in UI 500-A, at a second magnification level, different from the first magnification level, in the predefined range of magnification levels, as shown in FIG. 5B. Map 502 at the second magnification level is identified as map 502-B. Landmark 504-A from map 502-A is displayed as landmark 504-B in map 502-B.

In some embodiments, the view shown by map 502-B is different from the view shown by map 502-A. For example, map 502-A shows a two-dimensional overhead view, and map 502-B shows an angled view. Landmark 504-A, displayed from an overhead view in map 502-A, is displayed as landmark 504-B from an angle. Map 502-B may also include street 514, corresponding to a street 506 in map 502-A, displayed at an angle. In some other embodiments, the map shown at the second magnification level maintains the view shown at the first magnification level (e.g., an overhead view).

In FIG. 5B, gesture 516 is detected on touch screen 112 at a location corresponding to landmark 504-B. Gesture 516 includes contacts (e.g., finger contacts) 516-A and 516-B, both of which are at respective locations corresponding to landmark 504-B. In some embodiments, gesture 516 is a multi-finger tap gesture. In some other embodiments, the gesture 516 is a tap-and-hold gesture. In some further embodiments, gesture 516 is a depinch gesture; contacts 516-A and 516-B move apart from each other. In some further embodiments, gesture 516 is a single-finger tap gesture and gesture 516 has just one contact (e.g., contact 516-A).

Figure 5C:
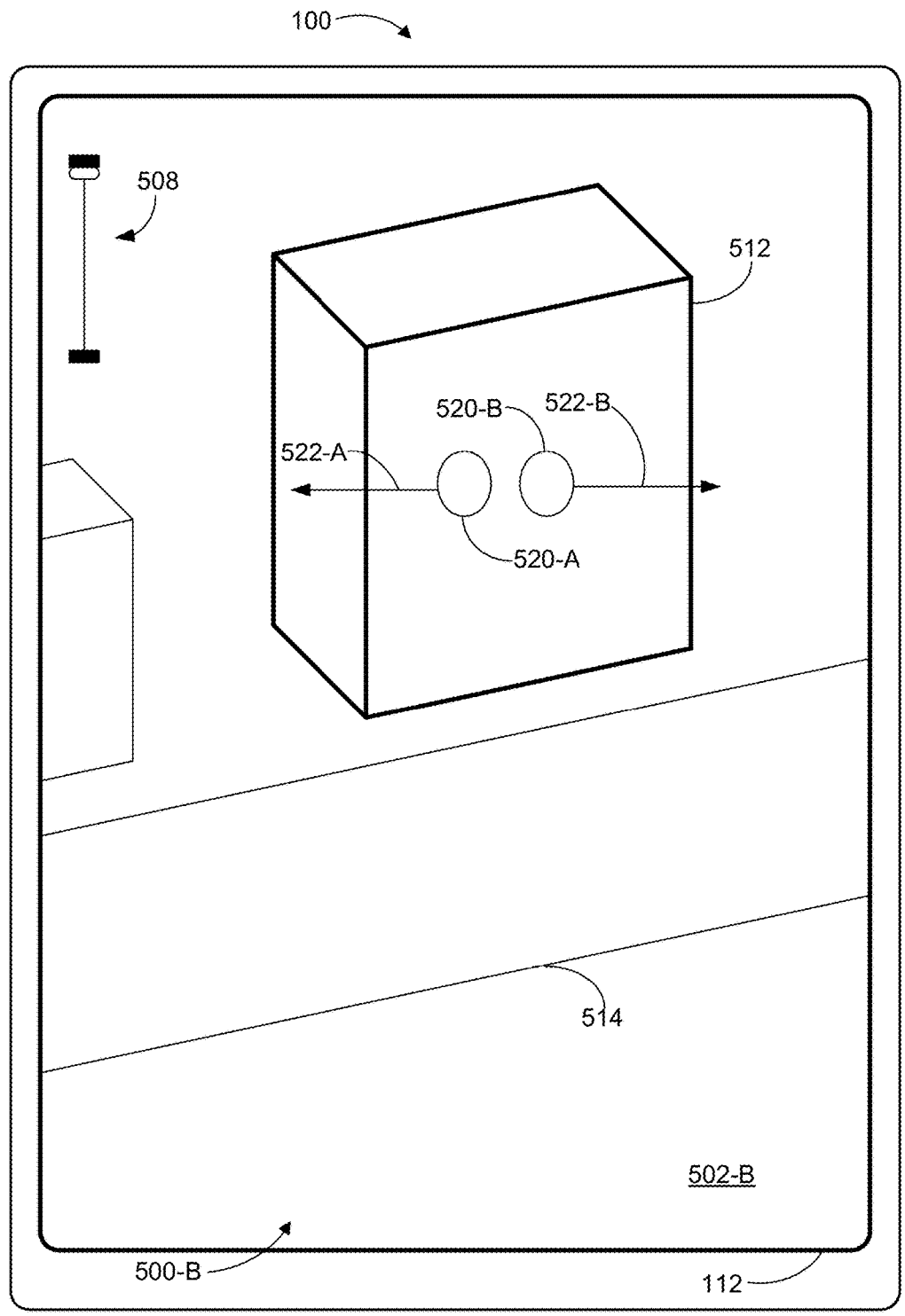

In response to the detection of gesture 516, map application changes to a second mode (e.g., a landmark information mode), and UI 500 is displayed in the second mode, as shown in FIG. 5C. UI 500 in the second mode is identified as UI 500-B. Map 502-B is displayed in UI 500-B. While displayed in UI 500-B, landmark 504-B is highlighted, becoming selected landmark 512. In some embodiments, selected landmark 512 is displayed as highlighted by displaying it in a different color than landmark 504-B, displayed with thicker or different colored borders (as in FIG. 5C), or displayed in some other way to visually distinguish it from landmark 504-B in the map viewing mode.

In some embodiments, the map application changes to the second mode in response to detection of a gesture if one or more predefined conditions are satisfied when the gesture is detected. An example of a mode-change condition is that the magnification level of map 502 is at a predefined magnification for changing to the second mode. For example, map 502-B in FIG. 5B is displayed at a predefined mode-change magnification level, and map 502-A in FIG. 5A is not displayed at the predefined mode-change magnification level. Thus, the map application changes to the second mode in response to the detection of gesture 516 but not gesture 510. In some embodiments, the predefined mode-change magnification level is the highest magnification level in the predefined range of magnification levels at which map 502 may be displayed.

Another example of a mode-change condition is that a contact in the gesture is maintained on the landmark to be selected for at least a predefined time (e.g., 0.5 second, 1 second, etc.). For example, in FIG. 5B, if gesture 516 (where gesture 516 is a tap and hold gesture) is detected on landmark 504-B for at least the predefined time, in response the map application changes to the second mode.

A further example of a mode-change condition is that there is a distinct second contact that is detected when a first contact in the gesture is detected on the landmark to be selected. For example, gesture 516 has contacts 516-A and 516-B that are both detected on landmark 504-B; contact 516-B satisfies the condition of the second contact. As another example, if gesture 516 has just one contact 516-A, then contact 518 (FIG. 5B) on map 502-B satisfies the condition of the second contact. In some embodiments, contact 518 must be away from any landmark 504 in map 502-B in order to satisfy the condition.

In FIG. 5C, gesture 520 is detected on touch screen 112 at a location corresponding to selected landmark 512 in map 502-B. Gesture 520 includes contacts 520-A and 520-B. Contact 520-A and 520-B are moving away from each other, in directions 522-A and 522-B respectively. In some embodiments, gesture 520 is a depinch gesture.

Figure 5D:
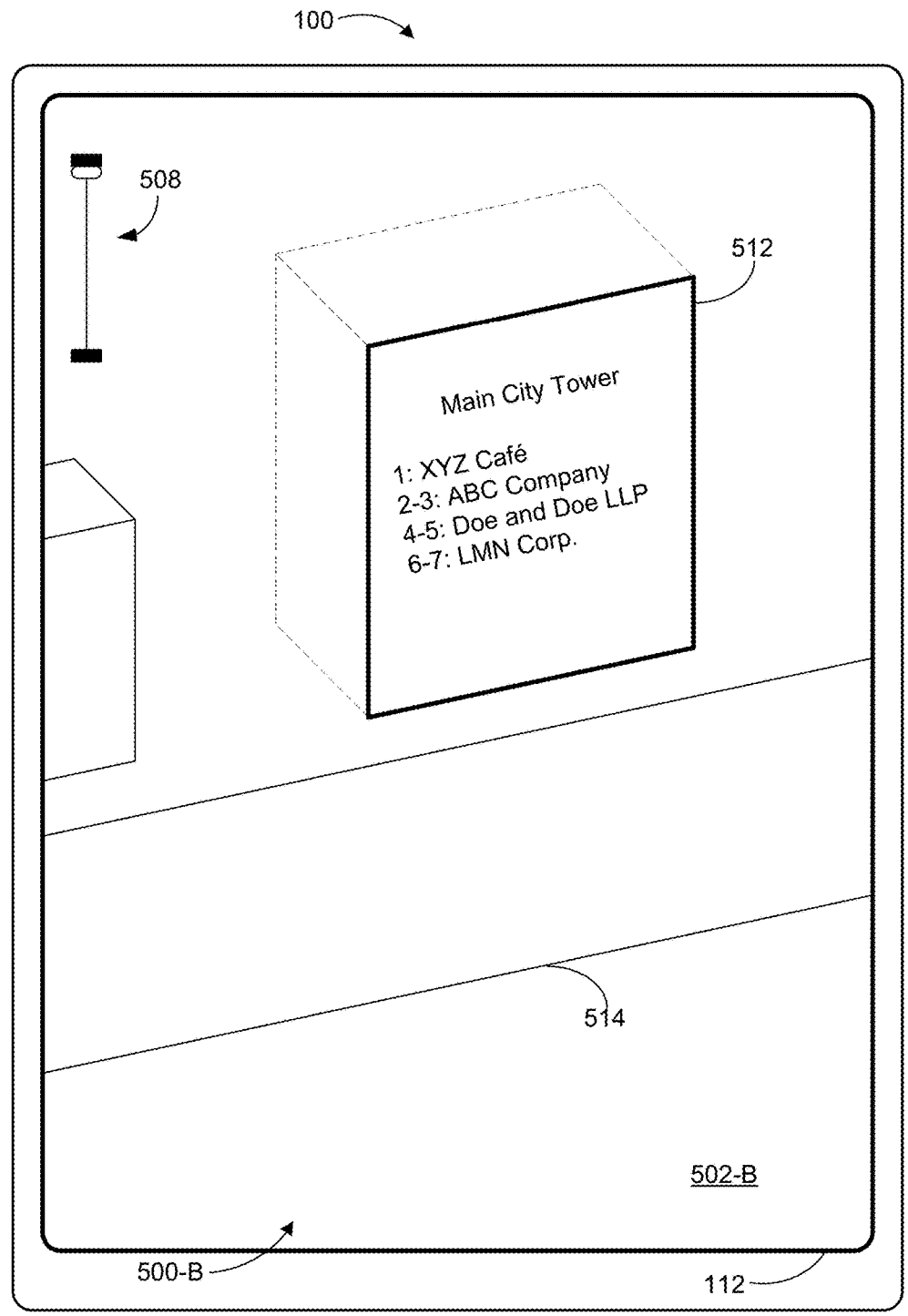
Figure 5E:
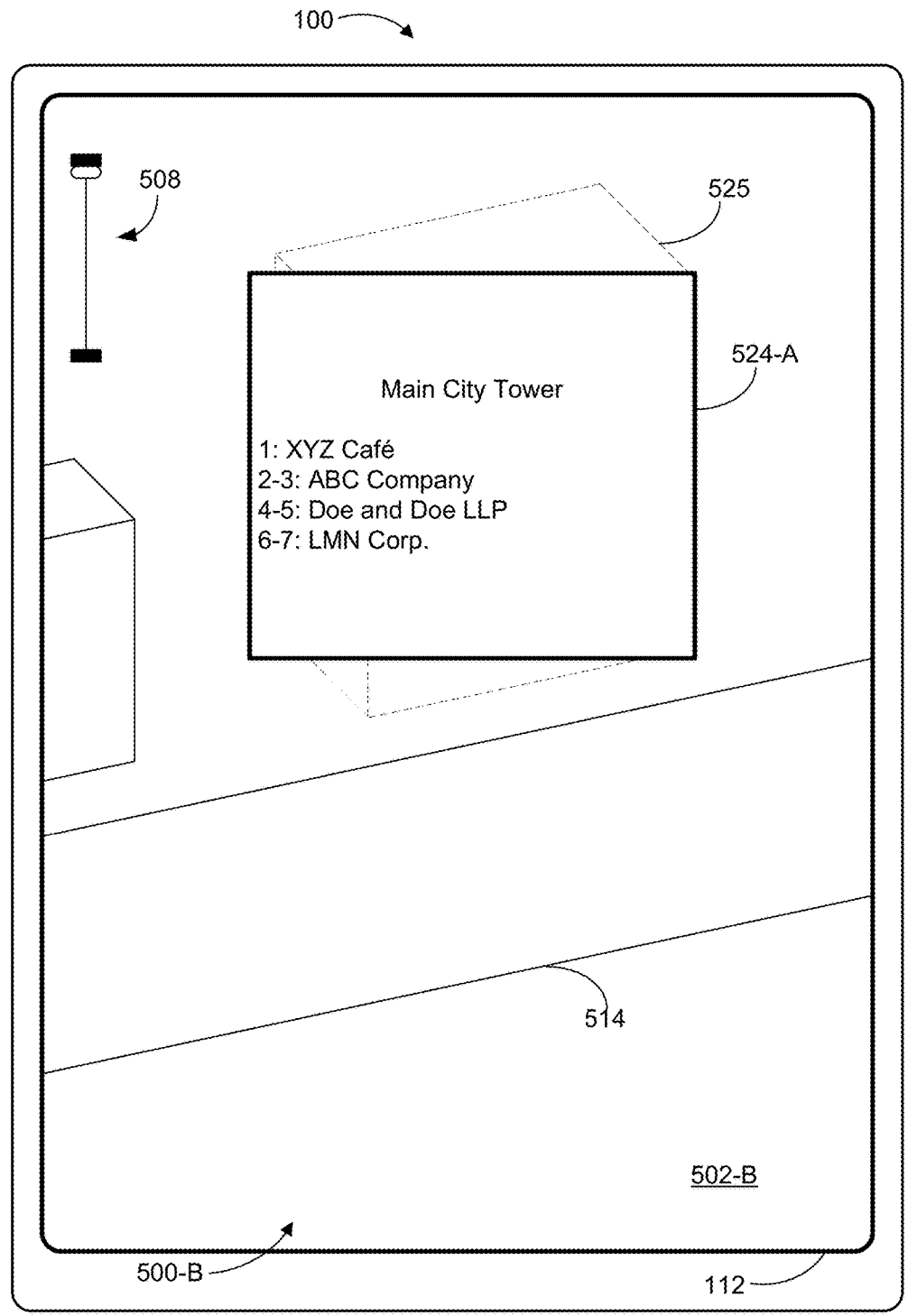

In response to the detection of gesture 520, information 524 (FIG. 5E) about selected landmark 512 is displayed. In some embodiments, an animation showing a transition from a display of selected landmark 512 to a display of information 524 is displayed. For example, FIG. 5D depicts an instant in the animation transitioning from a display of selected landmark 512 to a display of information 524. During the animation, the information about selected landmark 512 appears on selected landmark 512 (e.g., if selected landmark 512 is a building, the information appears on a face of the building), and portions of selected landmark 512 fade out, become transparent, or otherwise become visually less prominent. For example, as the animation instance depicted in FIG. 5D shows, the information is displayed on a face of selected landmark 512 and the rest of selected landmark begin to fade out. The face of selected landmark 512, which as shown is FIG. 5D is not parallel with the plane of touch screen 112, transitions during the animation to a panel, with information 524, parallel with the plane of touch screen 112, as shown in Figure 5E. The faded selected landmark 512 may be displayed as faded landmark 525, or selected landmark 512 may cease to be displayed entirely.

In some embodiments, gestures 516 (FIG. 5B) and 520 (FIG. 5C) are continuous with each other; there is no intervening lift-off of the finger contact(s) between gestures 516 and 520. For example, if gesture 516 is a tap and hold gesture on landmark 504-B (FIG. 5B), in response to the detection of gesture 516, selected landmark 512 is displayed (FIG. 5C). Contacts 516-A and 516-B are maintained on selected landmark 512; contacts 516-A and 516-B continue into gesture 520 as contacts 520-A and 520-B (FIG. 5C). Contacts 520-A and 520-B move apart in directions 522-A and 522-B, respectively, in gesture 520. In response to the detection of gesture 520, information 524 is displayed, as shown in, for example, FIG. 5E.

Any of a variety of information 524 about selected landmark 512 may be displayed in response to the detection of gesture 520. For example, if selected landmark 512 is a building, information about the building, such as building floor and occupant information 524-A, may be displayed, as shown in FIG. 5E. As another example, if selected landmark 512 is a park, information about the park, such as the layout of park facilities, may be displayed.

Figure 5F:
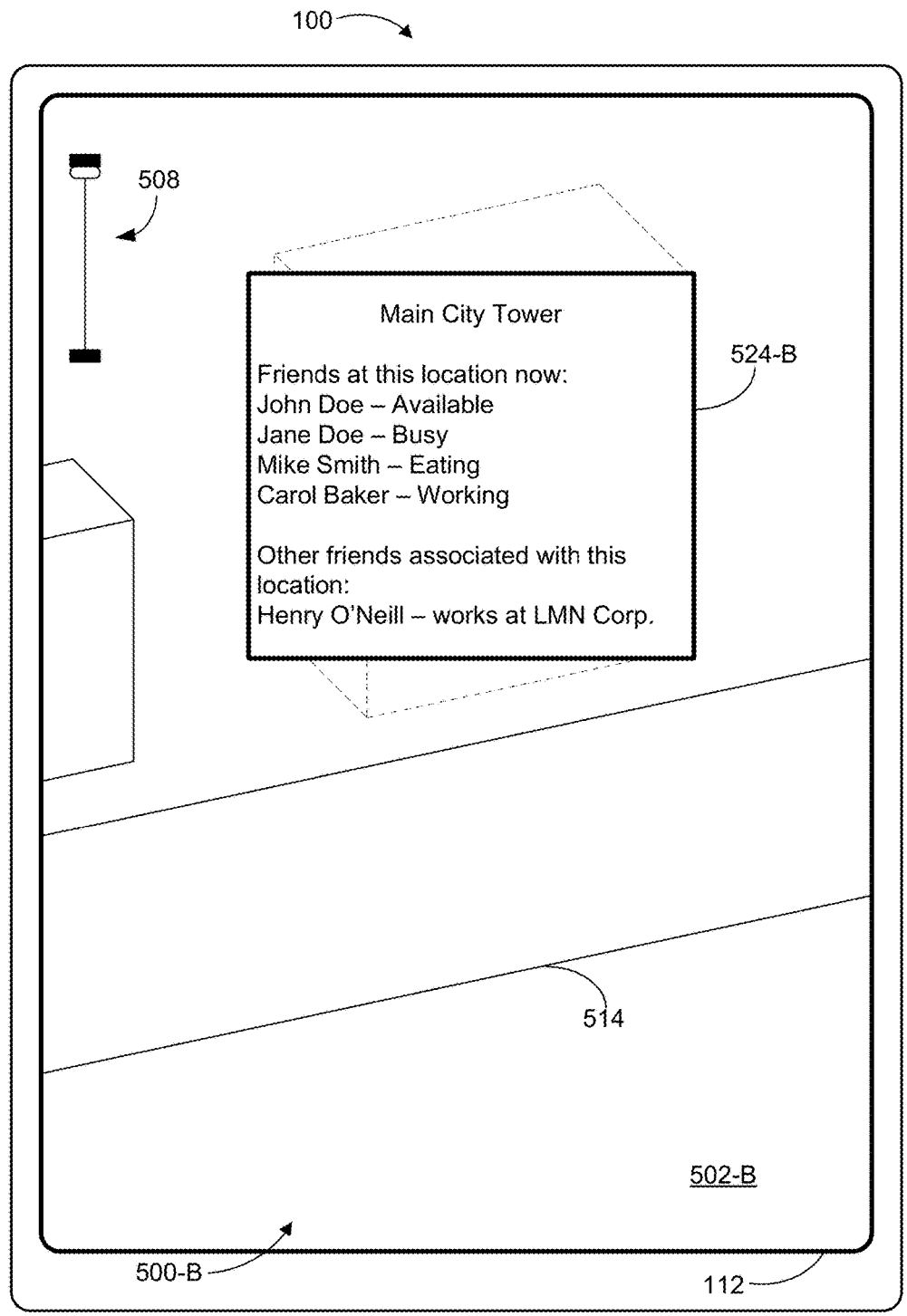

For a selected landmark 512, information 524-B regarding persons who are associated with selected landmark 512 may be displayed, as shown in FIG. 5F. Information 524-B regarding persons associated with selected landmark 512 may include one or more users whose locations (or more particularly, the respective locations of devices associated with the users) are being tracked (e.g., as friends of a user of device 100) to selected landmark 512 at the moment and their respective statuses (e.g., available, busy, or any user-customized status designation from the tracked user). Information 524-B may include one or more persons who are associated with selected landmark 512 or occupants of selected landmark 512 (e.g., a person is an employee at a business at the selected landmark 512). In some embodiments, information regarding persons and their association with selected landmark 512 or its occupants are derived from user profiles (e.g., a social network profile, a user profile associated with a device, or contact information) of those persons.

Figure 5G:
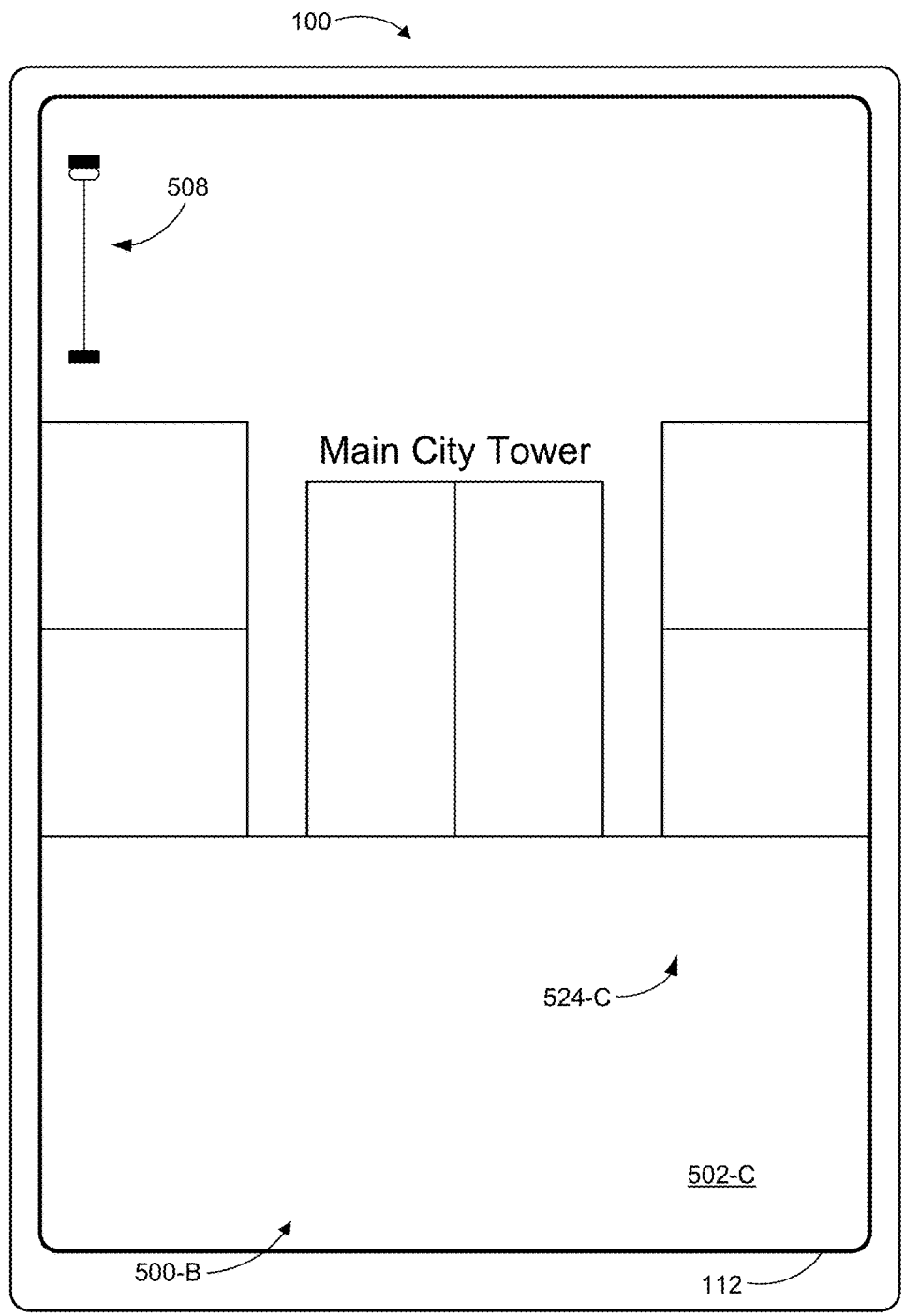
Figure 5H:
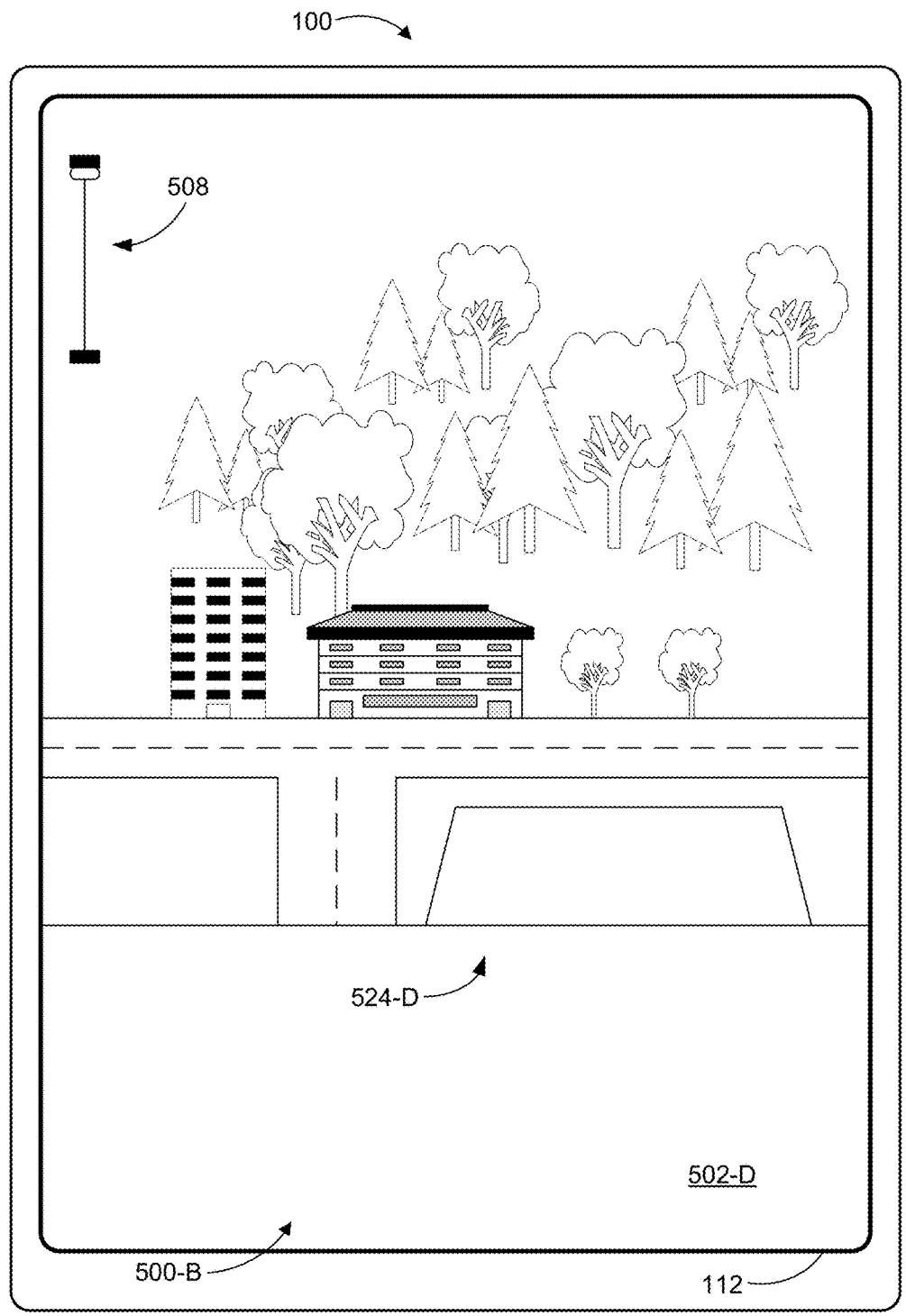

For a selected landmark 512, street-level view 524-C of selected landmark 512 may be displayed, as shown in FIG. 5G. Alternatively, a panoramic view 524-D from the perspective of selected landmark 512 may be displayed, as shown in FIG. 5H.

Figure 5I:
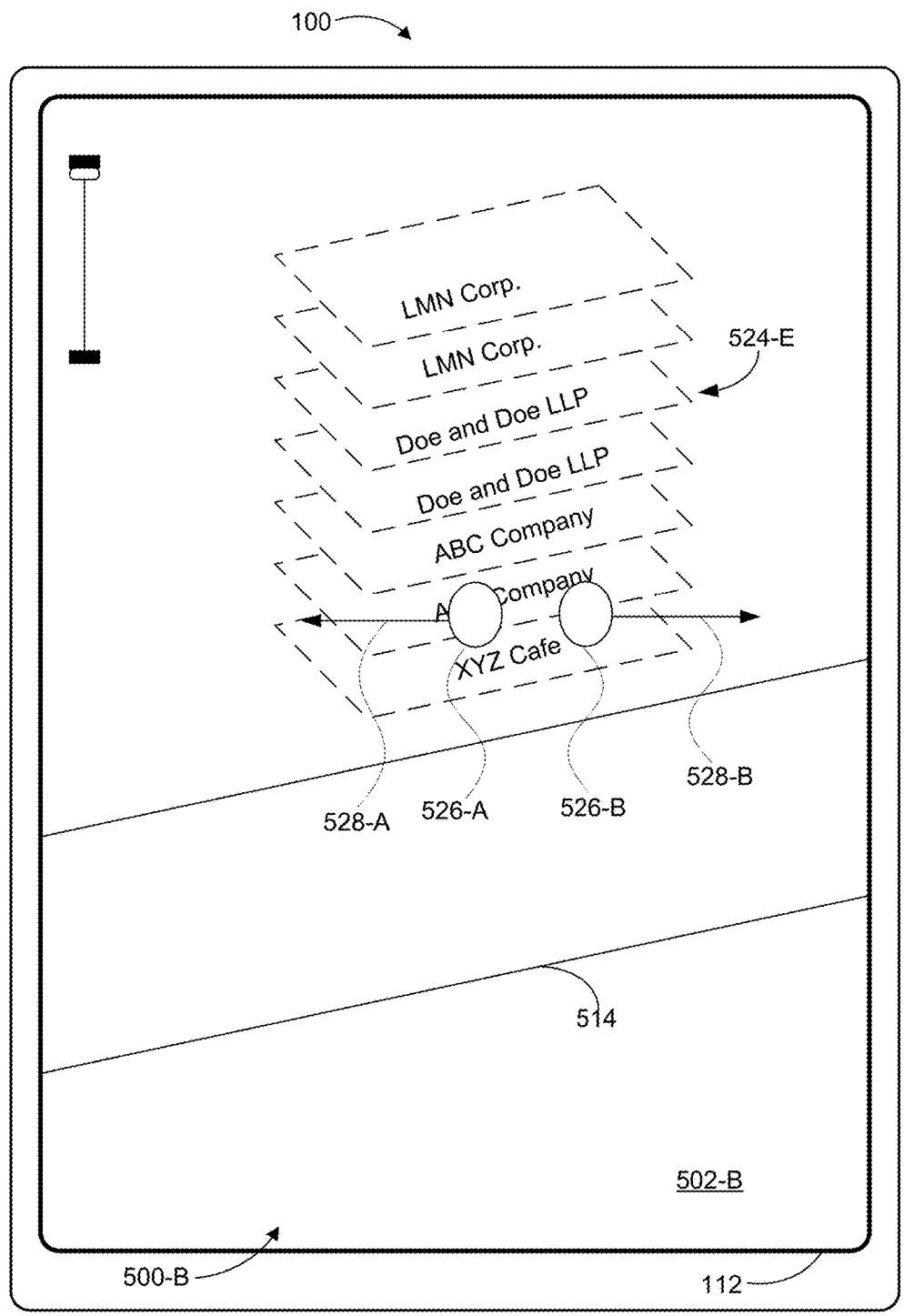

When selected landmark 512 is a building, building floor and occupant information 524-A may be displayed, as described above and as shown in FIG. 5E. Alternatively, building floor and occupant information for selected landmark 512 may be displayed in building floor breakout 524-E, as shown in FIG. 5I. In some embodiments, floor breakout 524-E includes graphical representations of the individual floors of selected landmark 512, as well as labels on each floor representation identifying the occupants of the respective floor.

In FIG. 5I, gesture 526 is detected on touch screen 112 at a location corresponding to floor breakout 524-E. Gesture 526 includes contacts 526-A and 526-B. Contact 526-A and 526-B are moving away from each other, in directions 528-A and 528-B respectively; gesture 526 is a depinch gesture.

Figure 5J:
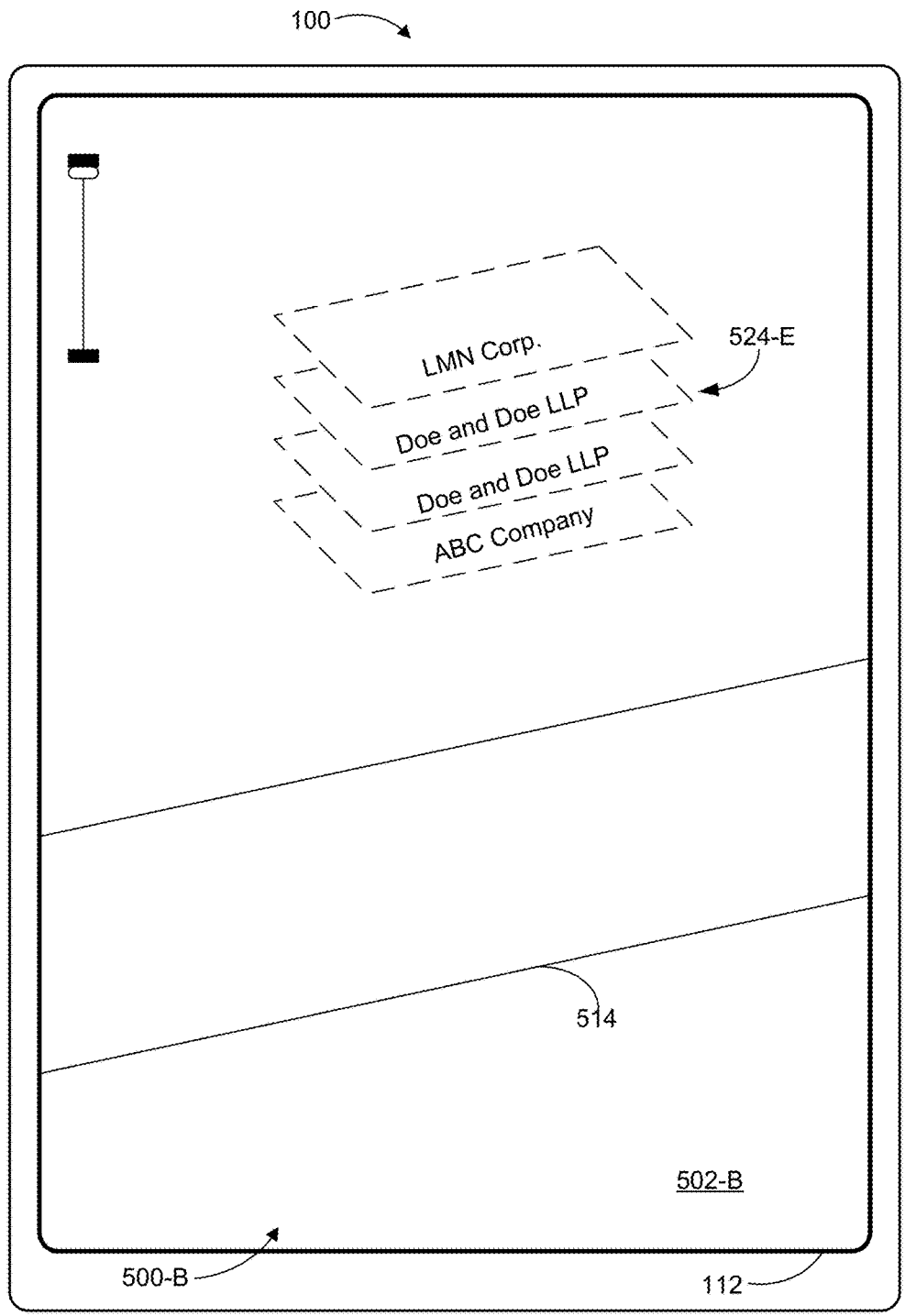
Figure 5K:
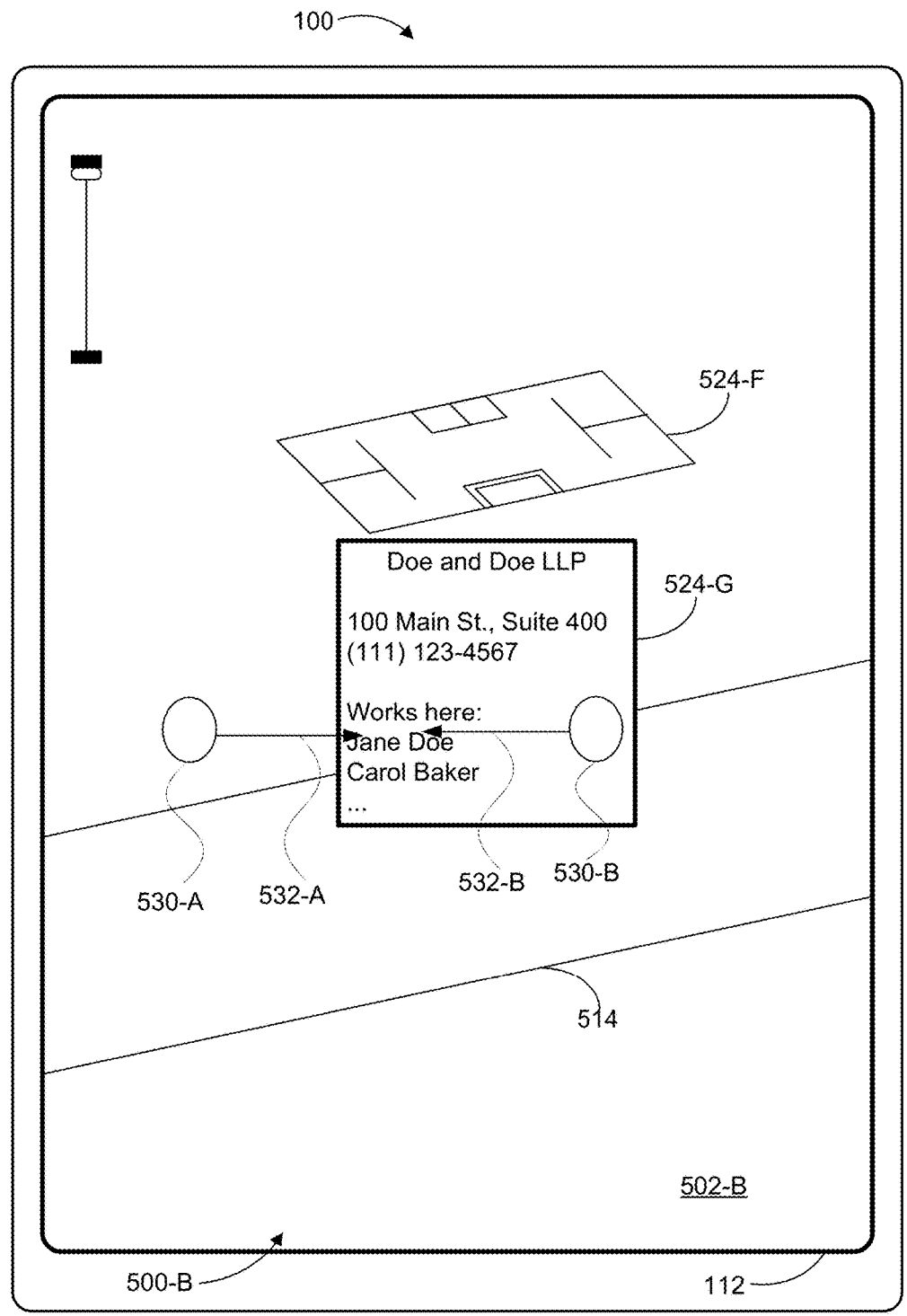
Figure 6A:
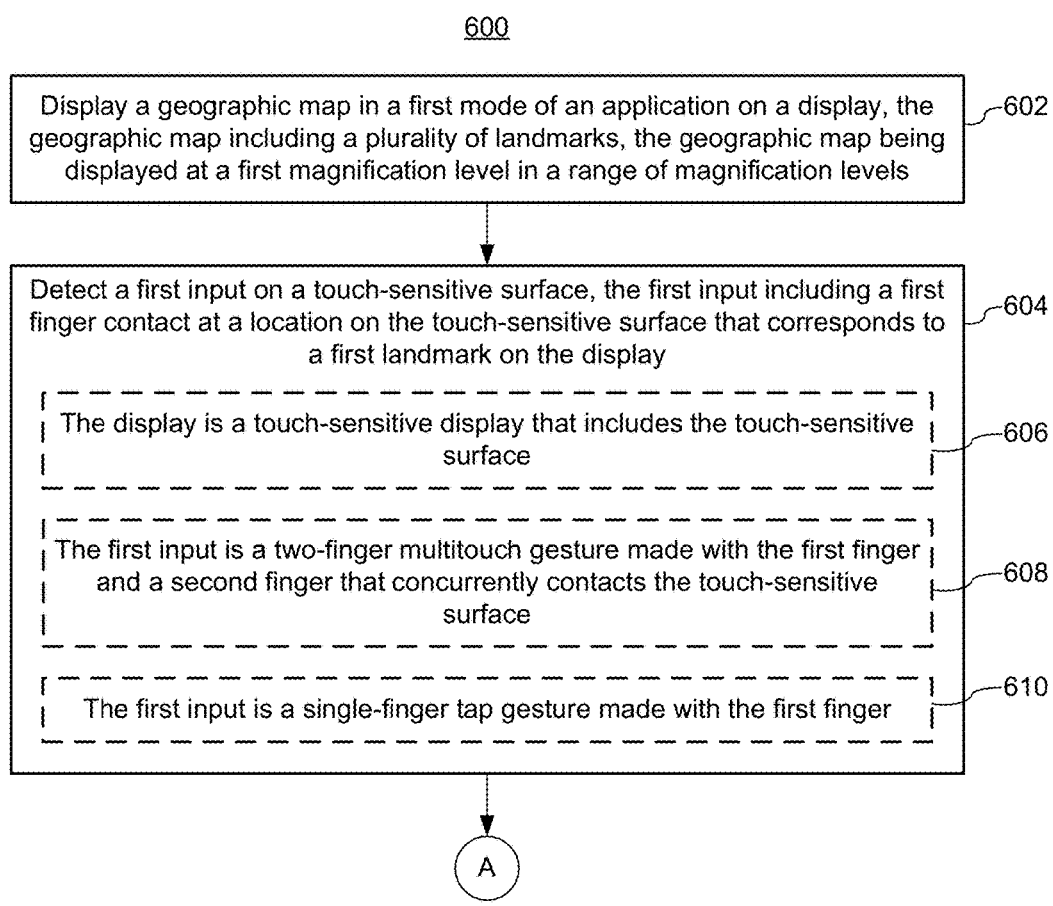
FIGS. 6A-6D are flow diagrams illustrating a method of navigating through information in a map-based interface in accordance with some embodiments.
Figure 6B:
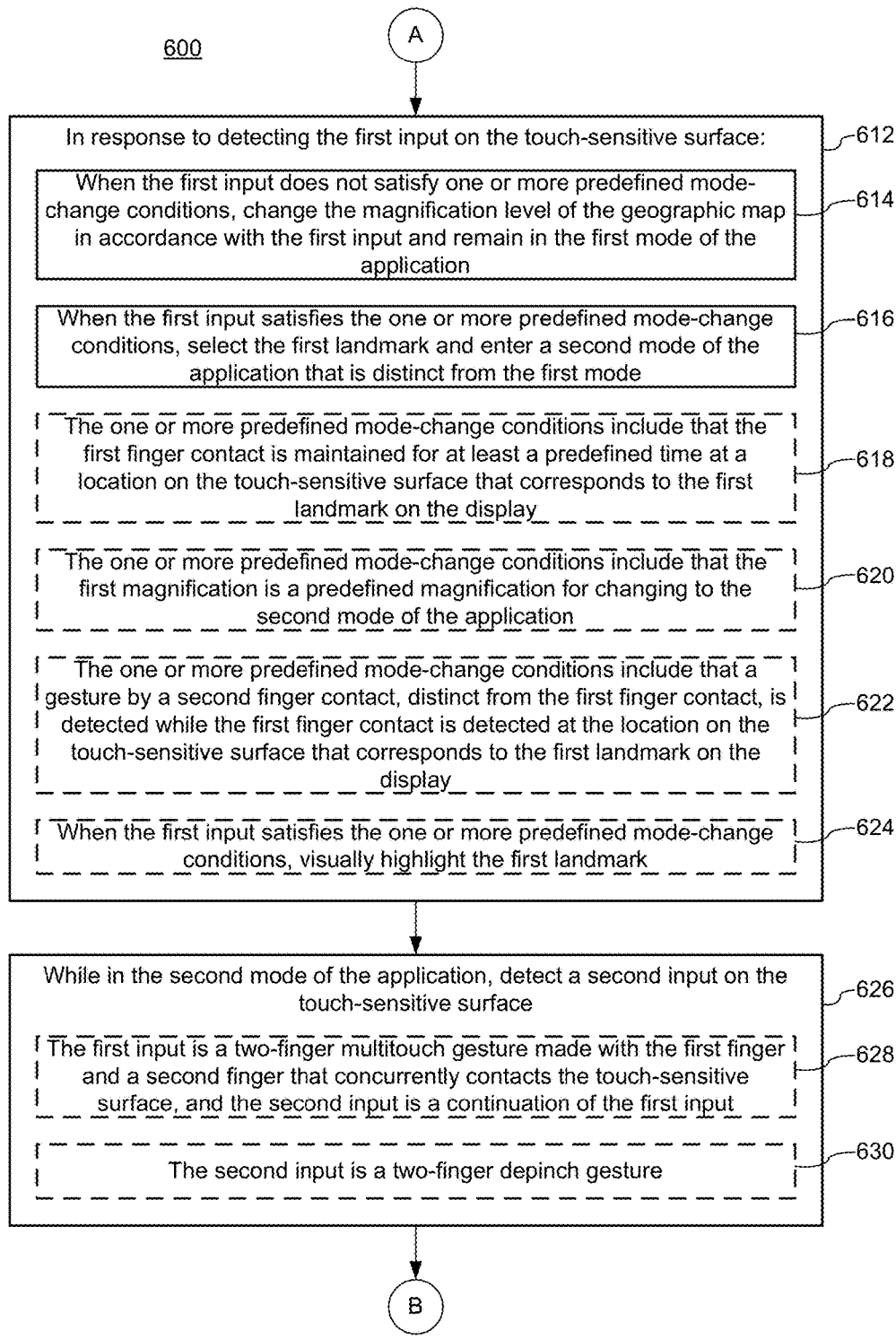
Figure 6C:
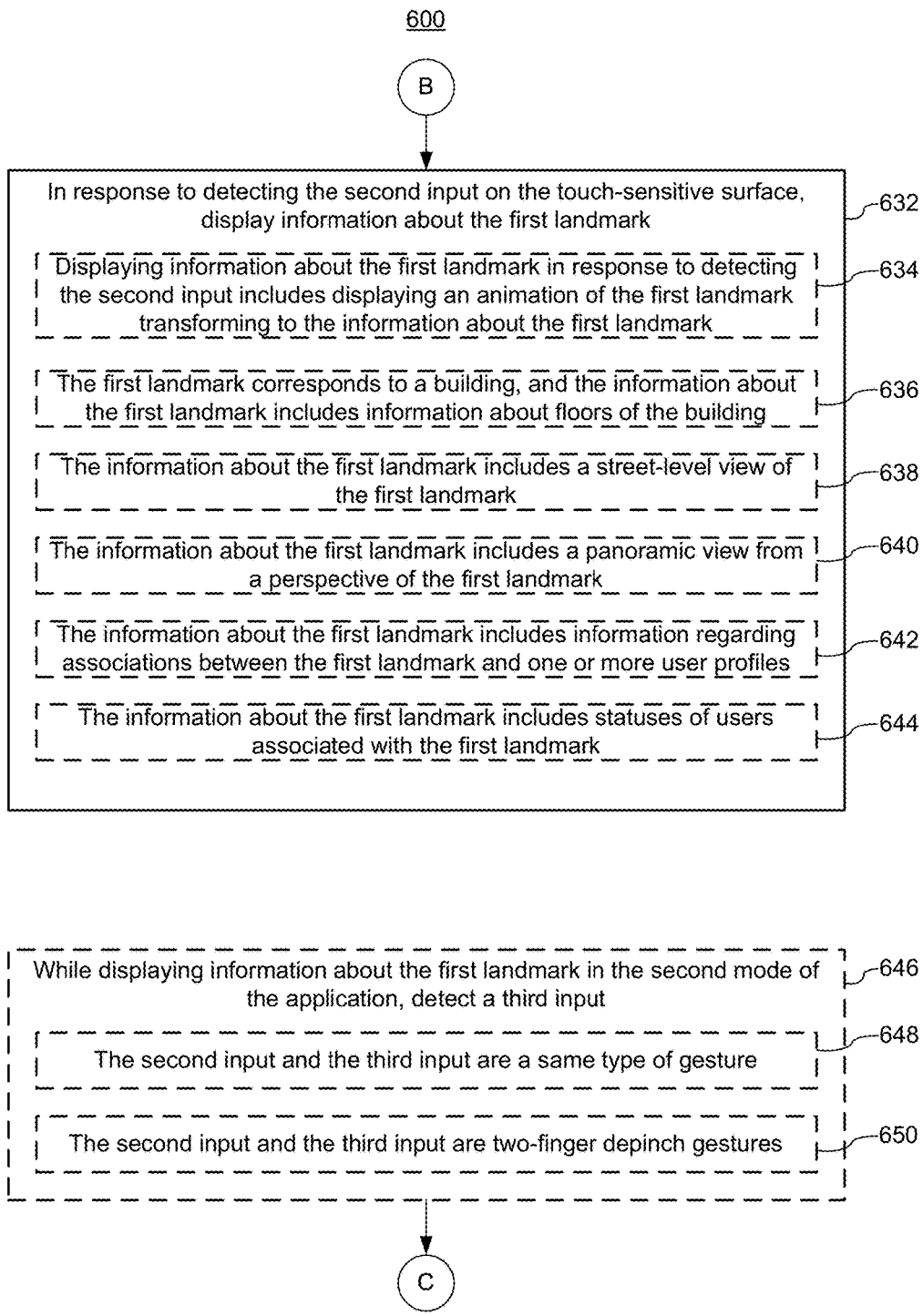
Figure 6D:
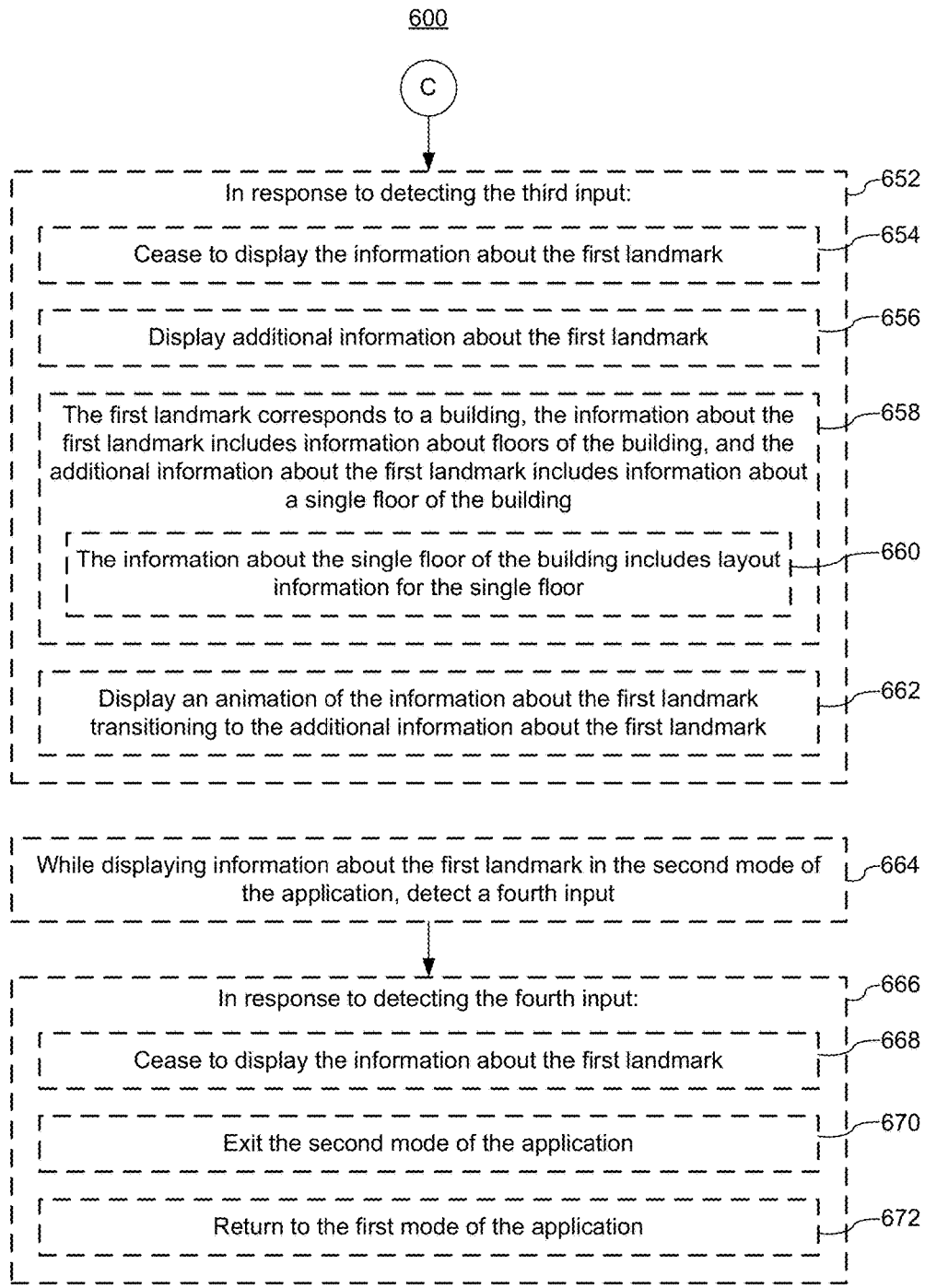

In response to the detection of gesture 526, information for a single floor of the building may be displayed. In some embodiments, an animation showing a transition from floor breakout 524-E to the single floor information is displayed. For example, the animation may show some floors in floor breakout 524-E ceasing to be displayed, as the animation instant depicted in FIG. 5J shows. When the animation is complete, single floor information for a floor in the building is displayed, as shown in FIG. 5K.

The single floor information may include floor plan information 524-F and detailed floor information 524-G (e.g., additional details regarding the floor occupant(s), users associated with the floor occupants, etc.) for a single floor. In some embodiments, the floor for which the single floor information is displayed may be iterated by successive gestures, such as successive depinch gestures. For example, in response to the detection of a depinch gesture on floor breakout 524-E, single floor information for the first floor is displayed. In response to the detection of a depinch gesture on the displayed single floor information for the first floor, single floor information for the second floor is displayed. In response to the detection of a depinch gesture on the displayed single floor information for the second floor, single floor information for the third floor is displayed, and so on.

As described above, a variety of information 524 for selected landmark 512 may be displayed. Each kind of information 524 may be referred to as a level of information. For example, building floor and occupant information 524-A may be one level of information, associated users information 524-B may be another level of information, single floor information for each floor is another level of information, and so on. In some embodiments, the levels of information may be iterated and displayed in accordance with a sequence in response to detection of successive gestures of the same type (e.g., depinch gestures). For example, in response to the detection of depinch gesture 520 on selected landmark 512 that is a building, building floor and occupant information 524-A may displayed, as shown in FIG. 5E. In response to the detection of a depinch gesture on building floor and occupant information 524-A, floor breakout 524-E may displayed. In response to the detection of a depinch gesture on floor breakout 524-E, single floor information (e.g., floor plan information 524-F, detailed floor information 524-G) for the first floor may displayed. In response to the detection of a depinch gesture on the displayed single floor information for the first floor, single floor information for the second floor may displayed. In response to the detection of a depinch gesture on the displayed single floor information for the second floor, single floor information for the third floor may displayed, and so on. In response to the detection of a depinch gesture on the displayed single floor information for the highest floor, associated persons information 524-B may be displayed, and so on. Eventually the sequence of levels of information loops back to floor breakout 524-E.

It should be appreciated that the sequence of levels of information above is merely exemplary. The sequence may include more or less levels than described above, including levels of information that are not described in this specification. The levels may be ordered within the sequence in any suitable order.

Returning to FIG. 5K, gesture 532 is detected on touch screen 112 at a location corresponding to the single floor information (in this case, detailed floor information 524-G). Gesture 532 includes contacts 530-A and 530-B, at least one of which is on the single floor information (e.g., detailed floor information 524-G). Contacts 530-A and 530-B are moving toward each other.

In response to the detection of gesture 532, information 524 about selected landmark 512 ceases to be displayed, and the map application returns to the first mode (i.e., map 502-B is displayed in UI 500-A, as shown in FIG. 5B). In some embodiments, while map 502-B is displayed in UI 500-B (e.g., whenever any information 524 is displayed), the map application returns to the first mode (i.e., map 502 is displayed in UI 500-A) in response to the detection of a pinch gesture on touch screen 112.

FIGS. 6A-6D are flow diagrams illustrating a method 600 of navigating through information in a map-based interface in accordance with some embodiments. The method 600 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to navigate through information in a map-based interface. The method reduces the cognitive burden on a user when navigating through information in a map-based interface, thereby creating a more efficient human-machine interface. For battery-operated electronic devices, enabling a user to navigate through information in a map-based interface faster and more efficiently conserves power and increases the time between battery charges.

The device displays (602) a geographic map in a first mode of an application (e.g., map application 154 or other application containing geographic information) on the display, the geographic map including a plurality of landmarks (e.g., buildings, parks, designated areas, or other physical locations), the geographic map being displayed at a first magnification level in a range of magnification levels. For example, map 502-A is displayed in UI 500-A, as shown in FIG. 5A. Map 502-A is displayed at a first magnification level in a predefined range of magnification levels. Map 502-A includes one or more landmarks 504. As another example, map 502-B is displayed in UI 500-A, as shown in FIG. 5B. Map 502-B is displayed at a second magnification level in the predefined range of magnification levels. Map 502-B also includes one or more landmarks 504.

The device detects (604) a first input on the touch-sensitive surface, the first input including a first finger contact at a location on the touch-sensitive surface that corresponds to a first landmark on the display. As shown in FIG. 5A, for example, gesture 510 is detected on landmark 504-A. Gesture 510 includes at least one contact 510-A on landmark 504-A. As another example, FIG. 5B shows gesture 516 being detected on landmark 504-B. Gesture 516 includes at least one contact 516-A on landmark 504-B. In some embodiments, the display is a touch-sensitive display that includes the touch-sensitive surface (606). For example, display 112 (FIGS. 5A-5B) is a touch screen.

In some embodiments, the first input is a two-finger multitouch gesture made with the first finger and a second finger that concurrently contacts the touch-sensitive surface (608). For example, gestures 510 and 516 shown in FIGS. 5A and 5B, respectively, each have a second concurrent contact 510-B and 516-B, respectively.

In some embodiments, the first input is a single-finger tap gesture made with the first finger (610). For example, gestures 510 and 516 shown in FIGS. 5A and 5B, respectively, may each be tap gestures with just one contact 510-A and 516-A, respectively.

In response to detecting the first input on the touch-sensitive surface (612), when the first input does not satisfy one or more predefined mode-change conditions, the device changes (614) the magnification level of the geographic map in accordance with the first input and remains in the first mode of the application. When the first input satisfies the one or more predefined mode-change conditions, the device selects (616) the first landmark and enters a second mode of the application that is distinct from the first mode.

For example, in response to the detection of gesture 510, UI 500-A, corresponding to the first mode, continues to be displayed but map 502-A changes magnification level and map 502-B is displayed (FIG. 5B). On the other hand, in response to the detection of gesture 516, UI 500-B is displayed and selected landmark 512 corresponding to landmark 504-B is displayed (FIG. 5C). In the case of gesture 510, the one or more mode-change conditions (e.g., map 502 being at a predefined mode-change magnification level) were not satisfied when gesture 510 is detected. Conversely, in the case of gesture 516, the condition(s) were satisfied.

In some embodiments, the one or more predefined mode-change conditions include that the first finger contact is maintained for at least a predefined time (e.g., 0.3, 0.5, 1.0, or 2.0 seconds) at a location on the touch-sensitive surface that corresponds to the first landmark on the display (618). For example, this condition is satisfied if, for gesture 510, at least contact 510-A is held at landmark 504-A (FIG. 5A) for at least the predefined time; selected landmark 512 would be displayed in map 502 (in either map 502-A or 502-B) in UI 500-B in response to gesture 510 (not shown). This condition is also satisfied if, for gesture 516, at least contact 516-A is held at landmark 504-B (FIG. 5B) for at least the predefined time; selected landmark 512 is displayed in map 502 in UI 500-B in response to the detection of gesture 516.

In some embodiments, the one or more predefined mode-change conditions include that the first magnification is a predefined magnification for changing to the second mode of the application (620) (e.g., a predefined magnification level at which a two-finger depinch gesture will result in a mode change, rather than a zoom-in or other magnifying operation). For example, as shown in FIGS. 5A-5B, map 502-A is not at the predefined magnification and map 502-B is at the predefined magnification. A mode change does not occur in response to the detection of a gesture 510 that is a depinch gesture while map 502-A is displayed. In contrast, a mode change occurs in response to the detection of gesture 516 that is a depinch gesture while map 502-B is displayed.

In some embodiments, the one or more predefined mode-change conditions include that a gesture by a second finger contact, distinct from the first finger contact, is detected while the first finger contact is detected at the location on the touch-sensitive surface that corresponds to the first landmark on the display (622) (e.g., a tap gesture with the second finger). For example, the condition is satisfied if gesture 518 is detected while contact 516-A is detected on landmark 504-B, as shown in FIG. 5B.

In some embodiments, when the first input satisfies the one or more predefined mode-change conditions, the device visually highlights the first landmark (624) (e.g., displaying a border around the selected landmark or otherwise visually distinguishing the selected landmark in response to the first input). For example, selected landmark 512 in FIG. 5C is displayed with thicker borders.

While in the second mode of the application, the device detects (626) a second input on the touch-sensitive surface. For example, as shown in FIG. 5C, while selected landmark is displayed in UI 500-B (corresponding to the second mode), gesture 520 is detected.

In some embodiments, the first input is a two-finger multitouch gesture made with the first finger and a second finger that concurrently contacts the touch-sensitive surface, and the second input is a continuation of the first input (628) (e.g., a two-finger touch-and-hold gesture followed, without breaking contact with the touch-sensitive surface, by a two-finger depinch gesture after the device enters the second mode). For example, gesture 516 includes contacts 516-A and 516-B. Gesture 516 may be a tap and hold gesture that continues into depinch gesture 520.

In some embodiments, the second input is a two-finger depinch gesture (630). For example, gesture 520 is depicted in FIG. 5C as a depinch gesture. In response to detecting the second input on the touch-sensitive surface, the device displays (632) information about the first landmark. As shown in FIG. 5E, for example, in response to the detection of gesture 520, information 524 about selected landmark 512 corresponding to landmark 504-A is displayed.

In some embodiments, displaying information about the first landmark in response to detecting the second input includes displaying an animation of the first landmark transforming to the information about the first landmark (634). For example, in response to the detection of gesture 520, an animation of selected landmark 512 transforming to information 524-A about selected landmark 512 is displayed, as shown in FIGS. 5C-5E.

In some embodiments, the first landmark corresponds to a building, and the information about the first landmark includes information about floors of the building (636). For example, information 524-A depicted in FIG. 5E includes information about the floors of selected landmark 512. As another example, FIG. 5I shows floor breakout 524-E, which may be displayed in response to the detection of gesture 520.

In some embodiments, the information about the first landmark includes a street-level view of the first landmark (638). FIG. 5G shows street-level view 524-C of selected landmark 512, which may be displayed in response to the detection of gesture 520.

In some embodiments, the information about the first landmark includes a panoramic view from a perspective of the first landmark (640). FIG. 5H shows panoramic view 524-D from the perspective of selected landmark 512, which may be displayed in response to the detection of gesture 520.

In some embodiments, the information about the first landmark includes information regarding associations between the first landmark and one or more user profiles (642). For example, information 524-B regarding persons who are associated with selected landmark 512 (FIG. 5F) may include information regarding users who are associated with occupants of selected landmark 512. Such information may be derived from user profiles (e.g., if a user profile lists an occupant of selected landmark 512 as a current employer).

In some embodiments, the information about the first landmark includes statuses of users associated with the first landmark (644). For example, FIG. 5F shows information 524-B that indicates one or more users (e.g., "John Doe," "Jane Doe," etc.) at selected landmark 512 with various statuses (e.g., "available," "busy," "eating," etc.).

In some embodiments, while displaying information about the first landmark in the second mode of the application, the device detects (646) a third input (e.g., a two-finger depinch gesture at a location on the touch sensitive surface that corresponds to the information about the first landmark).

In some embodiments, the second input and the third input are a same type of gesture (648). For example, gesture 520 (FIG. 5C) and gesture 526 (FIG. 5I) are both gestures of the same type.

In some embodiments, the second input and the third input are two-finger depinch gestures (650). For example, gesture 520 (FIG. 5C) and gesture 526 (FIG. 5I) are both depinch gesture with two contacts.

In some embodiments, in response to detecting the third input (652), the device ceases to display (654) the information about the first landmark, and displays (656) additional information about the first landmark. In other words, the information about the first landmark that is displayed in response to detecting the second input is replaced with other information about the first landmark in response to detecting the third input. For example, as shown in FIGS. 5I-5K, in response to the detection of gesture 526, floor breakout 524-E is replaced with floor plan information 524-F and detailed floor information 524-G for a single floor.

In some embodiments, the first landmark corresponds to a building, the information about the first landmark includes information about floors of the building, and the additional information about the first landmark includes information about a single floor of the building (658). Floor breakout 524-E in FIG. 5I, for example, shows information about the floors of selected landmark 512 where selected landmark 512 is a building. Floor plan information 524-F and detailed floor information 524-G, shown in FIG. 5K shows information for a single floor for selected landmark 512 where selected landmark 512 is a building.

In some embodiments, the information about the single floor of the building includes layout information for the single floor (660). For example, floor plan information 524-F shows the floor plan or layout for a floor of a building.

In some embodiments, in response to detecting the third input (652), the device displays (662) an animation of the information about the first landmark transitioning to the additional information about the first landmark. For example, FIGS. 5I-5K shows floor breakout 524-E transitioning to floor plan information 524-F and detailed floor information 524-G.

In some embodiments, while displaying information about the first landmark in the second mode of the application, the device detects (664) a fourth input (e.g., a two-finger pinch gesture). In response to detecting the fourth input (666), the device ceases (668) to display the information about the first landmark, exits (670) the second mode of the application, and returns (672) to the first mode of the application. For example, as shown in FIG. 5K, while UI 500-B is displayed, gesture 532 is detected. In response to the detection of gesture 532, floor plan information 524-F and detailed floor information 524-G cease to be displayed, and the map application changes back to the first mode (e.g., UI 500-B transitions to UI 500-A, as in FIG. 5B, and landmark 504-B is re-displayed).

It should be understood that the particular order in which the operations in FIGS. 6A-6D have been described is merely exemplary and is not intended to indicate that the described order is the only order in which the operations could be performed. One of ordinary skill in the art would recognize various ways to reorder the operations described herein.

Figure 7:
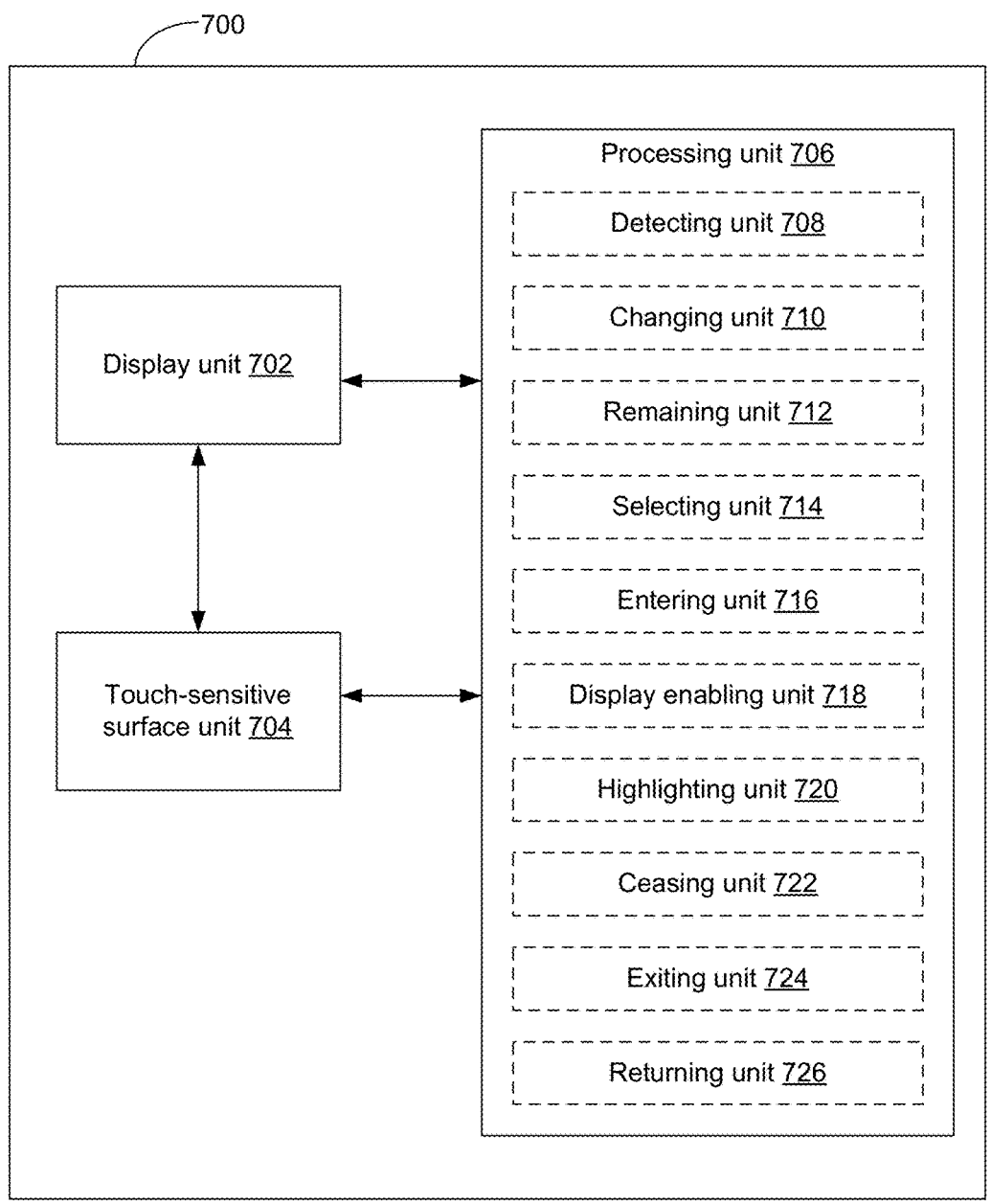
FIG. 7 is a functional block diagram of an electronic device in accordance with some embodiments.

In accordance with some embodiments, FIG. 7 shows a functional block diagram of an electronic device 700 configured in accordance with the principles of the invention as described above. The functional blocks of the device may be implemented by hardware, software, or a combination of hardware and software to carry out the principles of the invention. It is understood by persons of skill in the art that the functional blocks described in FIG. 7 may be combined or separated into sub-blocks to implement the principles of the invention as described above. Therefore, the description herein may support any possible combination or separation or further definition of the functional blocks described herein.

As shown in FIG. 7, an electronic device 700 includes a display unit 702 configured to display a geographic map in a first mode of an application on the display unit 702, the geographic map including a plurality of landmarks, the geographic map being displayed at a first magnification level in a range of magnification levels; a touch-sensitive surface unit 704 configured to receive inputs and gestures; and a processing unit 706 coupled to the display unit 702 and the touch-sensitive surface unit 704. In some embodiments, the processing unit 706 includes a detecting unit 708, a changing unit 710, a remaining unit 712, a selecting unit 714, an entering unit 716, a display enabling unit 718, a highlighting unit 720, a ceasing unit 722, an exiting unit 724, and a returning unit 726.

The processing unit 706 is configured to: detect a first input on the touch-sensitive surface unit 704, the first input including a first finger contact at a location on the touch-sensitive surface unit 704 that corresponds to a first landmark on the display unit 702 (e.g., with the detecting unit 708); in response to detecting the first input on the touch-sensitive surface unit 704: when the first input does not satisfy one or more predefined mode-change conditions, change the magnification level of the geographic map in accordance with the first input (e.g., with the changing unit 710) and remain in the first mode of the application (e.g., with the remaining unit 712); and when the first input satisfies the one or more predefined mode-change conditions, select the first landmark (e.g., with the selecting unit 714) and enter a second mode of the application that is distinct from the first mode (e.g., with the entering unit 716); while in the second mode of the application, detect a second input on the touch-sensitive surface unit 704 (e.g., with the detecting unit 708); and, in response to detecting the second input on the touch-sensitive surface unit 704, enable display of information about the first landmark (e.g., with the display enabling unit 718).

In some embodiments, the display unit 702 is a touch-sensitive display unit 702 that includes the touch-sensitive surface unit 704.

In some embodiments, wherein the first input is a two-finger multitouch gesture made with the first finger and a second finger that concurrently contacts the touch-sensitive surface unit 704.

In some embodiments, wherein the first input is a two-finger multitouch gesture made with the first finger and a second finger that concurrently contacts the touch-sensitive surface unit 704, and the second input is a continuation of the first input.

In some embodiments, wherein the first input is a single-finger tap gesture made with the first finger.

In some embodiments, wherein the one or more predefined mode-change conditions include that the first finger contact is maintained for at least a predefined time at a location on the touch-sensitive surface unit 704 that corresponds to the first landmark on the display unit 702.

In some embodiments, wherein the one or more predefined mode-change conditions include that the first magnification is a predefined magnification for changing to the second mode of the application.

In some embodiments, wherein the one or more predefined mode-change conditions include that a gesture by a second finger contact, distinct from the first finger contact, is detected while the first finger contact is detected at the location on the touch-sensitive surface unit 704 that corresponds to the first landmark on the display unit 702.

In some embodiments, wherein the processing unit 706 is configured to, when the first input satisfies the one or more predefined mode-change conditions, visually highlight the first landmark (e.g., with the highlighting unit 720).

In some embodiments, wherein the second input is a two-finger depinch gesture.

In some embodiments, wherein enabling display of information about the first landmark in response to detecting the second input includes enabling display of an animation of the first landmark transforming to the information about the first landmark.

In some embodiments, the first landmark corresponds to a building, and the information about the first landmark includes information about floors of the building.

In some embodiments, the information about the first landmark includes a street-level view of the first landmark.

In some embodiments, the information about the first landmark includes a panoramic view from a perspective of the first landmark.

In some embodiments, the information about the first landmark includes information regarding associations between the first landmark and one or more user profiles.

In some embodiments, the information about the first landmark includes statuses of users associated with the first landmark.

In some embodiments, the processing unit 706 is configured to: while displaying information about the first landmark in the second mode of the application, detect a third input (e.g., with the detecting unit 708); and, in response to detecting the third input: cease to display the information about the first landmark (e.g., with the ceasing unit 722); and enable display of additional information about the first landmark (e.g., with the display enabling unit 718).

In some embodiments, the second input and the third input are a same type of gesture.

In some embodiments, the second input and the third input are two-finger depinch gestures.

In some embodiments, the first landmark corresponds to a building, the information about the first landmark includes information about floors of the building, and the additional information about the first landmark includes information about a single floor of the building.

In some embodiments, the information about the single floor of the building includes layout information for the single floor.

In some embodiments, the processing unit 706 is configured to: in response to detecting the third input: enable display of an animation of the information about the first landmark transitioning to the additional information about the first landmark (e.g., with the display enabling unit 718).

In some embodiments, the processing unit 706 is configured to: while displaying information about the first landmark in the second mode of the application, detect a fourth input (e.g., with the detecting unit 708); and, in response to detecting the fourth input: cease to display the information about the first landmark (e.g., with the ceasing unit 722); exit the second mode of the application (e.g., with the exiting unit 724); and return to the first mode of the application (e.g., with the returning unit 726).

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 6A-6D may be implemented by components depicted in FIGS. 1A-1B. For example, detection operations 604 and 626, changing and remaining operations 614, selecting and entering operations 616, and displaying operation 632 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
displaying a geographic map in a first mode of an application on the display, the geographic map including a plurality of landmarks, the geographic map being displayed at a first magnification level in a range of magnification levels;
detecting a first input on the touch-sensitive surface, the first input including a first contact at a location on the touch-sensitive surface that corresponds to a first landmark on the display;
in response to detecting the first input on the touch-sensitive surface:
when the first input does not satisfy one or more predefined mode-change conditions, changing the magnification level of the geographic map in accordance with the first input and remaining in the first mode of the application; and
when the first input satisfies the one or more predefined mode-change conditions, selecting the first landmark and entering a second mode of the application that is distinct from the first mode,
wherein the one or more predefined mode-change conditions include that the first magnification is a predefined magnification for changing to the second mode of the application;
while in the second mode of the application, detecting a second input on the touch-sensitive surface; and
in response to detecting the second input on the touch-sensitive surface, displaying information about the first landmark.

2. The electronic device of claim 1, wherein the display is a touch-sensitive display that includes the touch-sensitive surface.

3. The electronic device of claim 1, wherein the first input is a two-finger multitouch gesture made with a first finger and a second finger that concurrently contacts the touch-sensitive surface.

4. The electronic device of claim 1, wherein the first input is a two-finger multitouch gesture made with a first finger and a second finger that concurrently contacts the touch-sensitive surface, and the second input is a continuation of the first input.

5. The electronic device of claim 1, wherein the first input is a single-finger tap gesture made with a first finger.

6. The electronic device of claim 1, wherein the one or more predefined mode-change conditions include that the first contact is maintained for at least a predefined time at a location on the touch-sensitive surface that corresponds to the first landmark on the display.

7. The electronic device of claim 1, wherein the one or more predefined mode-change conditions include that a gesture by a second contact, distinct from the first contact, is detected while the first contact is detected at the location on the touch-sensitive surface that corresponds to the first landmark on the display.

8. The electronic device of claim 1, including instructions for, when the first input satisfies the one or more predefined mode-change conditions, visually highlighting the first landmark.

9. The electronic device of claim 1, wherein the second input is a two-finger depinch gesture.

10. The electronic device of claim 1, wherein displaying information about the first landmark in response to detecting the second input includes displaying an animation of the first landmark transforming to the information about the first landmark.

11. The electronic device of claim 1, wherein the first landmark corresponds to a building, and the information about the first landmark includes information about floors of the building.

12. The electronic device of claim 1, wherein the information about the first landmark includes a street-level view of the first landmark.

13. The electronic device of claim 1, wherein the information about the first landmark includes a panoramic view from a perspective of the first landmark.

14. The electronic device of claim 1, wherein the information about the first landmark includes information regarding associations between the first landmark and one or more user profiles.

15. The electronic device of claim 1, wherein the information about the first landmark includes statuses of users associated with the first landmark.

16. The electronic device of claim 1, including instructions for:
while displaying information about the first landmark in the second mode of the application, detecting a third input; and
in response to detecting the third input:
ceasing to display the information about the first landmark; and
displaying additional information about the first landmark.

17. The electronic device of claim 16, wherein the second input and the third input are a same type of gesture.

18. The electronic device of claim 16, wherein the second input and the third input are two-finger depinch gestures.

19. The electronic device of claim 16, wherein the first landmark corresponds to a building, the information about the first landmark includes information about floors of the building, and the additional information about the first landmark includes information about a single floor of the building.

20. The electronic device of claim 19, wherein the information about the single floor of the building includes layout information for the single floor.

21. The electronic device of claim 16, including instructions for:
in response to detecting the third input:
displaying an animation of the information about the first landmark transitioning to the additional information about the first landmark.

22. The electronic device of claim 1, including instructions for:
while displaying information about the first landmark in the second mode of the application,
detecting a fourth input; and
in response to detecting the fourth input:
ceasing to display the information about the first landmark;
exiting the second mode of the application; and
returning to the first mode of the application.

23. The electronic device of claim 1, wherein the first landmark is displayed on the geographic map.

24. The electronic device of claim 1, including instructions for:
in response to detecting the first input on the touch-sensitive surface:
when the first input satisfies the one or more predefined mode-change conditions,
maintaining the magnification level while selecting the first landmark and entering the second mode of the application.

25. A method, comprising:
at an electronic device with a display and a touch-sensitive surface:
displaying a geographic map in a first mode of an application on the display, the geographic map including a plurality of landmarks, the geographic map being displayed at a first magnification level in a range of magnification levels;
detecting a first input on the touch-sensitive surface, the first input including a first contact at a location on the touch-sensitive surface that corresponds to a first landmark on the display;
in response to detecting the first input on the touch-sensitive surface:
when the first input does not satisfy one or more predefined mode-change conditions, changing the magnification level of the geographic map in accordance with the first input and remaining in the first mode of the application; and
when the first input satisfies the one or more predefined mode-change conditions, selecting the first landmark and entering a second mode of the application that is distinct from the first mode,
wherein the one or more predefined mode-change conditions include that the first magnification is a predefined magnification for changing to the second mode of the application;
while in the second mode of the application, detecting a second input on the touch-sensitive surface; and
in response to detecting the second input on the touch-sensitive surface, displaying information about the first landmark.

26. The method of claim 25, wherein the display is a touch-sensitive display that includes the touch-sensitive surface.

27. The method of claim 25, wherein the first input is a two-finger multitouch gesture made with a first finger and a second finger that concurrently contacts the touch-sensitive surface.

28. The method of claim 25, wherein the first input is a two-finger multitouch gesture made with a first finger and a second finger that concurrently contacts the touch-sensitive surface, and the second input is a continuation of the first input.

29. The method of claim 25, wherein the first input is a single-finger tap gesture made with a first finger.

30. The method of claim 25, wherein the one or more predefined mode-change conditions include that the first contact is maintained for at least a predefined time at a location on the touch-sensitive surface that corresponds to the first landmark on the display.

31. The method of claim 25, wherein the one or more predefined mode-change conditions include that a gesture by a second contact, distinct from the first contact, is detected while the first contact is detected at the location on the touch-sensitive surface that corresponds to the first landmark on the display.

32. The method of claim 25, further comprising, when the first input satisfies the one or more predefined mode-change conditions, visually highlighting the first landmark.

33. The method of claim 25, wherein the second input is a two-finger depinch gesture.

34. The method of claim 25, wherein displaying information about the first landmark in response to detecting the second input includes displaying an animation of the first landmark transforming to the information about the first landmark.

35. The method of claim 25, wherein the first landmark corresponds to a building, and the information about the first landmark includes information about floors of the building.

36. The method of claim 25, wherein the information about the first landmark includes a street-level view of the first landmark.

37. The method of claim 25, wherein the information about the first landmark includes a panoramic view from a perspective of the first landmark.

38. The method of claim 25, wherein the information about the first landmark includes information regarding associations between the first landmark and one or more user profiles.

39. The method of claim 25, wherein the information about the first landmark includes statuses of users associated with the first landmark.

40. The method of claim 25, further comprising:
while displaying information about the first landmark in the second mode of the application, detecting a third input; and
in response to detecting the third input:
ceasing to display the information about the first landmark; and
displaying additional information about the first landmark.

41. The method of claim 40, wherein the second input and the third input are a same type of gesture.

42. The method of claim 40, wherein the second input and the third input are two-finger depinch gestures.

43. The method of claim 40, wherein the first landmark corresponds to a building, the information about the first landmark includes information about floors of the building, and the additional information about the first landmark includes information about a single floor of the building.

44. The method of claim 43, wherein the information about the single floor of the building includes layout information for the single floor.

45. The method of claim 40, further comprising:
in response to detecting the third input:
displaying an animation of the information about the first landmark transitioning to the additional information about the first landmark.

46. The method of claim 25, further comprising:
while displaying information about the first landmark in the second mode of the application, detecting a fourth input; and
in response to detecting the fourth input:
ceasing to display the information about the first landmark;
exiting the second mode of the application; and
returning to the first mode of the application.

47. The method of claim 25, wherein the first landmark is displayed on the geographic map.

48. The method of claim 25, further comprising:
in response to detecting the first input on the touch-sensitive surface:
when the first input satisfies the one or more predefined mode-change conditions, maintaining the magnification level while selecting the first landmark and entering the second mode of the application.

49. A non-transitory computer-readable storage medium storing one or more programs configured to be executed by one or more processors of an electronic device with a display and a touch-sensitive surface, the one or more programs including instructions for:
displaying a geographic map in a first mode of an application on the display, the geographic map including a plurality of landmarks, the geographic map being displayed at a first magnification level in a range of magnification levels;
detecting a first input on the touch-sensitive surface, the first input including a first contact at a location on the touch-sensitive surface that corresponds to a first landmark on the display;
in response to detecting the first input on the touch-sensitive surface:
when the first input does not satisfy one or more predefined mode-change conditions, changing the magnification level of the geographic map in accordance with the first input and remaining in the first mode of the application; and
when the first input satisfies the one or more predefined mode-change conditions, selecting the first landmark and entering a second mode of the application that is distinct from the first mode,
wherein the one or more predefined mode-change conditions include that the first magnification is a predefined magnification for changing to the second mode of the application;
while in the second mode of the application, detecting a second input on the touch-sensitive surface; and
in response to detecting the second input on the touch-sensitive surface, displaying information about the first landmark.

50. The non-transitory computer-readable storage medium of claim 49, wherein the display is a touch-sensitive display that includes the touch-sensitive surface.

51. The non-transitory computer-readable storage medium of claim 49, wherein the first input is a two-finger multitouch gesture made with a first finger and a second finger that concurrently contacts the touch-sensitive surface.

52. The non-transitory computer-readable storage medium of claim 49, wherein the first input is a two-finger multitouch gesture made with a first finger and a second finger that concurrently contacts the touch-sensitive surface, and the second input is a continuation of the first input.

53. The non-transitory computer-readable storage medium of claim 49, wherein the first input is a single-finger tap gesture made with a first finger.

54. The non-transitory computer-readable storage medium of claim 49, wherein the one or more predefined mode-change conditions include that the first contact is maintained for at least a predefined time at a location on the touch-sensitive surface that corresponds to the first landmark on the display.

55. The non-transitory computer-readable storage medium of claim 49, wherein the one or more predefined mode-change conditions include that a gesture by a second contact, distinct from the first contact, is detected while the first contact is detected at the location on the touch-sensitive surface that corresponds to the first landmark on the display.

56. The non-transitory computer-readable storage medium of claim 49, including instructions for, when the first input satisfies the one or more predefined mode-change conditions, visually highlighting the first landmark.

57. The non-transitory computer-readable storage medium of claim 49, wherein the second input is a two-finger depinch gesture.

58. The non-transitory computer-readable storage medium of claim 49, wherein displaying information about the first landmark in response to detecting the second input includes displaying an animation of the first landmark transforming to the information about the first landmark.

59. The non-transitory computer-readable storage medium of claim 49, wherein the first landmark corresponds to a building, and the information about the first landmark includes information about floors of the building.

60. The non-transitory computer-readable storage medium of claim 49, wherein the information about the first landmark includes a street-level view of the first landmark.

61. The non-transitory computer-readable storage medium of claim 49, wherein the information about the first landmark includes a panoramic view from a perspective of the first landmark.

62. The non-transitory computer-readable storage medium of claim 49, wherein the information about the first landmark includes information regarding associations between the first landmark and one or more user profiles.

63. The non-transitory computer-readable storage medium of claim 49, wherein the information about the first landmark includes statuses of users associated with the first landmark.

64. The non-transitory computer-readable storage medium of claim 49, including instructions for:
while displaying information about the first landmark in the second mode of the application, detecting a third input; and
in response to detecting the third input:
ceasing to display the information about the first landmark; and
displaying additional information about the first landmark.

65. The non-transitory computer-readable storage medium of claim 64, wherein the second input and the third input are a same type of gesture.

66. The non-transitory computer-readable storage medium of claim 64, wherein the second input and the third input are two-finger depinch gestures.

67. The non-transitory computer-readable storage medium of claim 64, wherein the first landmark corresponds to a building, the information about the first landmark includes information about floors of the building, and the additional information about the first landmark includes information about a single floor of the building.

68. The non-transitory computer-readable storage medium of claim 67, wherein the information about the single floor of the building includes layout information for the single floor.

69. The non-transitory computer-readable storage medium of claim 64, including instructions for:
in response to detecting the third input:
displaying an animation of the information about the first landmark transitioning to the additional information about the first landmark.

70. The non-transitory computer-readable storage medium of claim 49, including instructions for:

while displaying information about the first landmark in the second mode of the application, detecting a fourth input; and in response to detecting the fourth input:
ceasing to display the information about the first landmark;
exiting the second mode of the application; and
returning to the first mode of the application.

71. The non-transitory computer-readable storage medium of claim 49, wherein the first landmark is displayed on the geographic map.

72. The non-transitory computer-readable storage medium of claim 49, including instructions for:
in response to detecting the first input on the touch-sensitive surface:
when the first input satisfies the one or more predefined mode-change conditions, maintaining the magnification level while selecting the first landmark and entering the second mode of the application.

* * * * *